(12) United States Patent
Masuda et al.

(10) Patent No.: US 8,211,542 B2
(45) Date of Patent: Jul. 3, 2012

(54) ARTIFICIAL HAIR MADE OF FLAME-RETARDANT POLYESTER

(75) Inventors: Toshiyuki Masuda, Hyogo (JP); Hiroyuki Shinbayashi, Osaka (JP)

(73) Assignee: Kaneka Corporation, Osaka (JP)

( * ) Notice: Subject to any disclaimer, the term of this patent is extended or adjusted under 35 U.S.C. 154(b) by 1350 days.

(21) Appl. No.: 11/662,001

(22) PCT Filed: Sep. 6, 2005

(86) PCT No.: PCT/JP2005/016350
§ 371 (c)(1),
(2), (4) Date: Aug. 22, 2007

(87) PCT Pub. No.: WO2006/028102
PCT Pub. Date: Mar. 16, 2006

(65) Prior Publication Data
US 2011/0269878 A1    Nov. 3, 2011

(30) Foreign Application Priority Data

Sep. 7, 2004   (JP) ................. 2004-260164
Oct. 19, 2004  (JP) ................. 2004-304503

(51) Int. Cl.
*D02G 3/16*   (2006.01)
*C08K 5/353*  (2006.01)
*C08K 5/1515* (2006.01)

(52) U.S. Cl. .......... 428/391; 524/95; 524/196; 524/409

(58) Field of Classification Search ................. 524/195, 524/196, 409, 95; 428/391
See application file for complete search history.

(56) References Cited

U.S. PATENT DOCUMENTS

| | | | |
|---|---|---|---|
| 3,941,752 A | 3/1976 | Kleiner et al. | |
| 3,980,599 A | 9/1976 | Kondo et al. | |
| 4,127,590 A | 11/1978 | Endo et al. | |
| 4,801,405 A | 1/1989 | Yamada et al. | |
| 5,290,835 A | 3/1994 | Hatayama et al. | |
| 5,300,241 A | 4/1994 | Mikami et al. | |
| 2004/0135121 A1* | 7/2004 | Toyoda et al. ........... 252/301.16 | |
| 2004/0195543 A1 | 10/2004 | Masuda et al. | |
| 2006/0194044 A1 | 8/2006 | Kowaki et al. | |
| 2006/0194045 A1 | 8/2006 | Masuda | |

FOREIGN PATENT DOCUMENTS

| | | |
|---|---|---|
| CA | 2019313 A1 | 12/1990 |
| EP | 1 693 490 A1 | 8/2006 |
| EP | 1 728 900 A1 | 12/2006 |
| GB | 1 598 845 | 9/1981 |
| JP | 43-17514 | 7/1968 |
| JP | 47-19864 | 6/1972 |
| JP | 47-19864 A | 6/1972 |
| JP | 53-19715 | 6/1978 |
| JP | 53-19716 B | 6/1978 |
| JP | 53-98499 A | 8/1978 |
| JP | 53-36079 | 9/1978 |
| JP | 53-13479 | 10/1978 |
| JP | 55-41610 B2 | 10/1980 |
| JP | 58-17310 B2 | 4/1983 |
| JP | 61-282419 | 12/1986 |
| JP | 61-282419 A | 12/1986 |
| JP | 01-24913 B2 | 5/1989 |
| JP | 3-27105 | 2/1991 |
| JP | 03-027105 A | 2/1991 |
| JP | 03-57990 B2 | 9/1991 |
| JP | 4-333612 | 11/1992 |
| JP | 04-333612 A | 11/1992 |
| JP | 5-93366 | 4/1993 |
| JP | 05-093366 A | 4/1993 |
| JP | 05-321155 A | 12/1993 |
| JP | 7-97732 | 4/1995 |
| JP | 07-097732 A | 4/1995 |
| JP | 7-102416 | 4/1995 |
| JP | 07-102416 A | 4/1995 |
| JP | 7-166420 | 6/1995 |
| JP | 07-166420 A | 6/1995 |
| JP | 8-134777 | 5/1996 |
| JP | 08-134777 A | 5/1996 |
| JP | 8-260245 | 10/1996 |
| JP | 08-260245 A | 10/1996 |
| JP | 8-325941 | 12/1996 |
| JP | 08-325941 A | 12/1996 |
| JP | 2693331 B2 | 9/1997 |
| JP | 10-102320 | 4/1998 |
| JP | 10-102320 A | 4/1998 |
| JP | 10-168655 * | 6/1998 |
| JP | 11-124732 A | 5/1999 |
| JP | 2000-109657 A | 4/2000 |
| JP | 2000-119972 | 4/2000 |
| JP | 2000-119972 A | 4/2000 |
| JP | 2000-313790 A | 11/2000 |
| JP | 2002-13070 A | 1/2002 |
| JP | 2002-128998 A | 5/2002 |
| JP | 2002-212835 A | 7/2002 |
| JP | 2002-348734 A | 12/2002 |
| JP | 2003-119674 A | 4/2003 |
| JP | 2005-42234 A | 2/2005 |
| JP | 2005-76147 A | 3/2005 |
| JP | 2005-171391 A | 3/2005 |
| JP | 2005-264397 A | 9/2005 |
| JP | 2005-273032 A | 10/2005 |
| JP | 2005-325504 | 11/2005 |
| JP | 2005-325504 A | 11/2005 |
| WO | 03/008679 A1 | 1/2003 |
| WO | 2005/010247 A1 | 2/2005 |
| WO | 2005/021848 A1 | 3/2005 |
| WO | 2005/056894 A1 | 6/2005 |
| WO | 2005/090658 A1 | 9/2005 |
| WO | 2005/100650 A1 | 10/2005 |

OTHER PUBLICATIONS

International Search Report, dated Dec. 20, 2005.

* cited by examiner

*Primary Examiner* — Ling Choi
*Assistant Examiner* — John Uselding
(74) *Attorney, Agent, or Firm* — Hamre, Schumann, Mueller & Larson, P.C.

(57) ABSTRACT

Artificial hair is made of flame-retardant polyester-based fiber formed of a composition obtained by melt-kneading 5 parts by weight to 30 parts by weight of a bromine-containing flame retardancy agent (B), 0.5 parts by weight to 10 parts by weight of an antimony compound (C) having an average particle diameter ranging from 1.5 μm to 15 μm, and 0.05 parts by weight to 10 parts by weight of at least one kind of a compound (D) selected from the group consisting of: biscarbodiimide compounds; polycarbodiimide compounds; bisoxazoline compounds; and isocyanate compounds, with respect to 100 parts by weight of polyester (A) made of at least one kind of polyalkylene terephthalate and copolyester that contains polyalkylene terephthalate as a main component. Also provided is a fiber for artificial hairs obtained by adhering to that fiber either a polyorganosiloxane-based fiber treating agent or a fiber treating agent containing a flame-retardant organosilicon compound.

23 Claims, No Drawings ent relates to a flame-retardant polyester-based artificial hair. More specifically, the present invention relates to a flame-retardant polyester-based artificial hair that maintains its fiber properties such as heat resistance and strength/elongation, and has excellent settability, touch feeling, combing smoothness, transparency and processing stability.

BACKGROUND ART

A fiber made of polyethylene terephthalate, or polyester that contains polyethylene terephthalate as a main component has a high melting point, a high modulus of elasticity, excellent heat resistance and excellent chemical resistance, and thus is used widely for curtains, rugs, clothes, blankets, cloths for sheets, table covers, cloths for covering chairs, wall materials, artificial hairs, interior materials for cars, exterior reinforcing materials, safety nets and the like.

For hair products such as hairpieces, hair wigs, crepe hairs, headbands and doll hairs, human hairs, artificial hairs (modacrylic fibers and polyvinyl chloride fibers) and the like have been, used conventionally. However, supplies of human hairs have been difficult, and the importance of artificial hairs has risen. Modacrylic fibers have been used frequently as artificial hair materials by utilizing its flame-retardant property, but they are insufficient in the point of its heat-resistible temperature. Recently, an artificial hair fiber using a fiber that contains polyester represented by polyethylene terephthalate as a main component, which has excellent heat resistance, has been suggested.

However, for using a polyester-based fiber as an artificial hair material, flame retardancy is necessary in the light of safety. Since conventional polyester-based fibers are flammable, improving flame retardancy of polyester fibers has been tried in various ways, for example, a method for making a fiber of polyester that is copolymerized with a flame-retardant monomer containing a phosphorus atom, a method for allowing a polyester fiber to contain a flame retardancy agent and the like are known.

As the method for copolymerizing the said flame-retardant monomer, for example, a method for copolymerizing a phosphorus compound that has a phosphorus atom serving as a cyclic factor and has excellent thermostability (Patent Document 1), a method for copolymerizing a carboxy phosphinic acid (Patent Document 2), a method for blending or copolymerizing a phosphorus compound with polyester that contains polyarylate (Patent Document 2) and the like are suggested. As the application of the flame retardancy technique to an artificial hair, for example, a polyester fiber that is copolymerized with a phosphorus compound (Patent Document 4) is suggested. However, since an artificial hair requires high flame resistance, for using the copolymerized polyester fiber for the artificial hair, its polymerization amount needs to be increased, and as a result, heat resistance of the polyester is decreased significantly, whereby melt spinning is made difficult. Moreover, in the case where a flame is close thereto, ignition or burning does not occur, but there is another problem in that melting or dripping occurs.

As the latter method for including the flame retardancy agent, a method for allowing a polyester fiber to contain fine particles of a halogenated cycloalkane compound (Patent Document 5), a method for including bromine atom-containing alkylcyclohexane (Patent Document 6) and the like are suggested. The method for allowing the polyester fiber to contain the flame retardancy agent has a problem in that a containing temperature is required to be as high as 150° C. or more in order to obtain sufficient heat resistance, a containing processing time is required to be long, or a large amount of a flame retardancy agent is required to be used, thereby causing problems such as a decrease of a fiber property, a decrease of productivity and an increase of a manufacturing cost.

On the other hand, the improvement of the flame retardancy by adding an antimony compound as a flame-retardant aid is suggested (Patent Documents 7 and 8), but in the case of performing it for a fiber, there occurs problems in that spin processibility is unstable due to a decrease of a melt viscosity, and filament breakage occurs due to the antimony particles and the like.

By the way, for the antimony compound that is used conventionally as the flame-retardant aid, for example, antimony trioxide having an average particle diameter ranging from about 0.5 μm to about 1 μm has been used widely, in the light of dispersibility, uniformity of the flame retardancy, availability and the like. However, antimony trioxide having an average particle diameter ranging from 0.4 μm to 1.0 μm has a high concealing power, and in the case of using the antimony trioxide having the particle diameter in the above-described range, a hue of the obtained filament is degraded (whitened), and transparency tends to be decreased. Moreover, in the case where the average particle diameter of the antimony trioxide is less than 0.4 μm, and in particular, less than 0.1 μm, the concealing power thereof is decreased, and the decrease of the hue becomes small, but aggregation is likely to occur, so that it is difficult to disperse uniformly without the aggregation. In the case where the aggregation occurs, it is possible that the filament breakage occurs, and non-uniform of the flame retardancy occurs.

Moreover, in the case of using the polyester-based fiber as an artificial hair, various silicone-based finishing agents (polyorganosiloxane-based fiber treating agents) are used generally in order to provide flexibility, smoothness and the like. For example, as the polyorganosiloxane-based fiber treating agent for providing flexibility, wrinkle resistance, elasticity and compression recovery, polydimethyl siloxane, polymethyl hydrogen siloxane, polydimethylsiloxane having hydroxyl groups at both ends, vinyl group-containing polyorganosiloxane, epoxy group-containing polyorganosiloxane, amino group-containing polyorganosiloxane, ester group-containing polyorganosiloxane, polyoxyalkylene-containing polyorganosiloxane and the like are exemplified.

Moreover, as the polyorganosiloxane-based fiber treating agent, treating agents made of combinations with alkoxysilane and/or polyacrylamide resin and a catalyst, and the like also are known.

For example, a method by using a treating agent that includes: polyorganosiloxane that contains at least two epoxy groups in one molecule; and polyorganosiloxane that contains an amino group (Patent Document 9), a method by using a treating agent that includes: polyorganosiloxane having hydroxyl groups at both ends; polyorganosiloxane containing an amino group and an alkoxy group in one molecule; and/or partial hydrolysate and condensate thereof (Patent Document 10) are disclosed.

Moreover, a treating agent that includes: polyorganosiloxane containing an epoxy group; and aminoalkyltrialkoxy silane (Patent Documents 11 and 12), and diorganopolysiloxane having triorganosiloxy groups at both ends that contains two or more amino groups in one molecule (Patent Document 13) are described. Other than these, a method by using a treating agent that includes: aminopolysiloxane containing two or more amino groups in one molecule; and alkoxysilane that contains one or more reactive group such as an amino group and an epoxy group (Patent Document 14) is suggested.

However, the polyester-based fibers to which these silicone-based finishing agents (polyorganosiloxane-based fiber treating agents) are added have improved smoothness, combing smoothness and the like, but since the silicone-based fiber treating agents themselves are flammable, there remains problems in that flammability of the non-flame-retardant synthetic fibers is promoted and flame retardancy of the flame-retardant synthetic fibers also is decreased significantly.

As described above, under the present circumstances, the flame-retardant polyester-based artificial hair that maintains its fiber properties such as heat resistance and strength/elongation of the conventional polyester fibers, and has excellent settability, touch feeling, combing smoothness, transparency and processing stability has not been obtained yet.

Patent document 1: JP 55(1980)-41610 B
Patent document 2: JP 53(1978)-13479 B
Patent document 3: JP 11(1999)-124732 A
Patent document 4: JP 3(1991)-27105 A
Patent document 5: JP 3(1991)-57990 B
Patent document 6: JP 1(1989)-24913 B
Patent document 7: Japanese Patent No. 2693331
Patent document 8: JP 2002-128998 A
Patent document 9: JP 43(1968)-17514 B
Patent document 10: JP 53(1978)-36079 B
Patent document 11: JP 53(1978)-197159 B
Patent document 12: JP 53(1978)-19716 B
Patent document 13: JP 53(1978)-98499 B
Patent document 14: JP 58(1983)-17310 B

DISCLOSURE OF INVENTION

Problem to be Solved by the Invention

The objects of the present invention are to solve the conventional problems as described above, and to provide a polyester-based artificial hair that maintains its fiber properties such as heat resistance and strength/elongation of typical polyester fibers, and has excellent settability, touch feeling, transparency and processing stability, and exceedingly high flame retardancy. A further object of the present invention is to provide a flame-retardant polyester-based artificial hair with improved combing smoothness.

Means for Solving Problem

As a result of the keen study for solving the above-described problems, the inventors of the present invention have obtained a flame-retardant polyester-based artificial that maintains its fiber properties such as heat resistance and strength/elongation of typical polyester fibers and has excellent settability, touch feeling, transparency and processing stability, by melt spinning polyester with a compound that contains a bromine-containing flame retardancy agent and an antimony compound having an average particle diameter ranging from 1.5 μm to 15 μm, and a composition that contains at least one kind of a compound selected from the group consisting of biscarbodiimide compounds, polycarbodiimide compounds, bisoxazoline compounds and isocyanate compounds, thereby having reached the present invention.

A first aspect of the present invention relates to a polyester-based artificial hair that is formed of a composition obtained by melt-kneading 5 parts by weight to 30 parts by weight of a bromine-containing flame retardancy agent (B), and 0.5 parts by weight to 10 parts by weight of an antimony compound (C) having an average particle diameter ranging from 1.5 μm to 15 μm, and 0.05 parts by weight to 10 parts by weight of at least one kind of compound (D) selected from the group of: biscarbodiimide compounds; polycarbodiimide compounds; bisoxazoline compounds; and isocyanate compounds, with respect to 100 parts by weight of polyester (A) made of at least one kind of polyalkylene terephthalate and copolyester that contains polyalkylene terephthalate as a main component. In the preferable polyester-based artificial hair, the polyester (A) is at least one kind of a polymer selected from the group consisting of polyethylene terephthalate; polypropylene terephthalate; and polybutylene terephthalate. In the preferable polyester-based artificial hair, the bromine-containing flame retardancy agent (B) is at least one kind of a compound selected from the group consisting of brominated aromatic-based flame retardancy agents; bromine-containing phosphoric ester-based flame retardancy agents; brominated polystyrene-based flame retardancy agents; brominated benzil acrylate-based flame retardancy agents; brominated epoxy-based flame retardancy agents; brominated phenoxy-based flame retardancy agents; brominated polycarbonate-based flame retardancy agents; tetrabromobisphenol A derivatives; bromine-containing triazine-based compounds; and bromine-containing isocyanuric acid-based compounds. In the preferable polyester-based artificial hair, the antimony compound (C) is at least one kind selected from the group consisting of: antimony trioxide; antimony tetraoxide; antimony pentaoxide; and sodium antimonite. It is more preferable that the flame-retardant polyester-based fiber is the polyester-based artificial hair formed of a composition that further contains at least one kind of a compound selected from the group consisting of: biscarbodiimide compounds; polycarbodiimide compounds; bisoxazoline compounds; and isocyanate compounds, as the component (D).

A second aspect of the present invention relates to an artificial hair that is made by attaching 0.01% omf to 1% omf of a polyorganosiloxane-based fiber treating agent (E) to the flame-retardant polyester-based fiber. It is preferable that the polyorganosiloxane-based fiber treating agent (E) is an artificial hair of polyorganosiloxane having a structural unit represented by a below general formula (1) or (2).

[Chemical Formula 1]

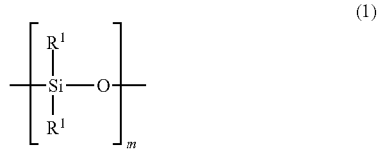

(where, in the formula, each $R^1$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, and m represents an integer ranging from 4 to 200),

[Chemical Formula 2]

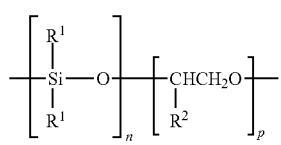

(2)

(where, in the formula, each of $R^1$ and $R^2$ is independent, and represents an alkyl group with a carbon number ranging from 1 to 10, an aryl group with a carbon number ranging from 6 to 10, an aralkyl group with a carbon number ranging from 7 to 10 or an alkyleneoxy group with a carbon number ranging from 1 to 80, which has a straight chain or a branch, and n and p represent integers ranging from 2 to 150, respectively).

In the preferable artificial hair, the polyorganosiloxane-based fiber treating agent (E) is made of polyorganosiloxane (E1) having reactivity and a hardening agent (E2), and a component ratio (E1)/(E2) ranges from 100/0 to 50/50 in weight ratio, and in the more preferable artificial hair, the polyorganosiloxane (E1) having the reactivity is polyorganosiloxane that has a repeating structure represented by below general formulae (3) to (5), and the hardening agent (E2) is a compound that has at least two reactive groups selected from the group consisting of an epoxy group, an amino group and an isocyanate group in one molecule, and/or a silane coupling agent.

[Chemical Formula 3]

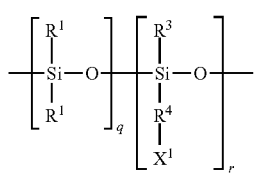

(3)

(where, in the formula, each of $R^1$ and $R^3$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, $R^4$ represents an alkylene group with a carbon number ranging from 1 to 20 or an alkyleneoxy group with a carbon number ranging from 1 to 80, which has a straight chain or a branch, $X^1$ represents a hydroxy group, an epoxy group or an amino group, and q and r represent integers ranging from 2 to 150, respectively),

[Chemical Formula 4]

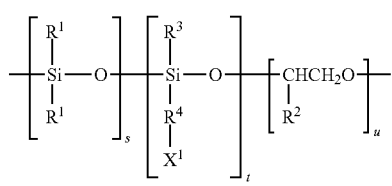

(4)

(where, in the formula, each of $R^1$, $R^2$ and $R^3$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, $R^4$ represents an alkylene group with a carbon number ranging from 1 to 20 or an alkyleneoxy group with a carbon number ranging from 1 to 80, which has a straight chain or a branch, $X^1$ represents a hydroxy group, an epoxy group or an amino group, and s, t and u represent integers ranging from 2 to 100, respectively),

[Chemical Formula 5]

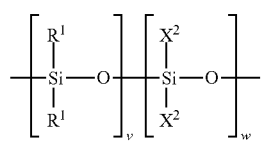

(5)

(where, in the formula, each $R^1$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, each $X^2$ is independent and represents a hydroxy group, an alkoxy group, a phenoxy group, a thioalkoxy group, an acyloxy group, an aminoxy group, a ketoximate group, an amino group, an amide group or an alkenyloxy group, and v and w represent integers ranging from 2 to 100, respectively).

In the preferable artificial hair, the polyorganosiloxane-based fiber treating agent (E) is a fiber treating agent (F) containing a flame-retardant organosilicon compound. In the more preferable artificial hair, a component (F) contains: an organosilicon compound (F1) in which a bromine-containing organic group is bonded to a silicon atom via a carbon atom; and/or an organosilicon compound (F2) in which a chlorine-containing organic group is bonded to a silicon atom via a carbon atom, a total content of (F1) and/or (F2) ranges from 10 wt % to 70 wt %, where a total amount of (F) is assumed to be 100 wt %, and a total content of the bromine and the chlorine in (F1) or (F2) ranges from 10 wt % to 50 wt %, where an amount of (F1) or (F2) is assumed to be 100 wt %. In the further more preferable artificial hair, the organosilicon compound (F1) and/or (F2) has a structure represented by a below general formula (6), and includes an alkyl group or an aromatic hydrocarbon group that contains at least one bromine or chlorine.

[Chemical Formula 6]

(6)

(where, in the structural formula, R represents a group selected from an alkyl group with a carbon number ranging from 1 to 6 or an aromatic hydrocarbon group with a carbon number ranging from 6 to 15 that contains at least one bromine or chlorine, a hydrogen atom and an alkoxyl group, and m represents an integer of 0 or more).

In the particularly preferable artificial hair, the organosilicon compound (F1) and/or (F2) includes a substituent having a structure that is represented by a below general formula (7) or (8),

[Chemical Formula 7]

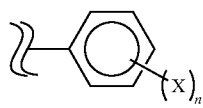

(7)

(where, in the structural formula, X represents Br or Cl, and n represents an integer ranging from 1 to 3),

[Chemical Formula 8]

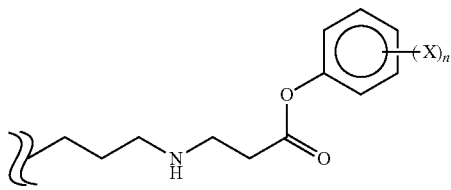

(8)

(where, in the structural formula, X represents Br or Cl, and n represents an integer ranging from 1 to 3).

In the more preferable artificial hair, the fiber treating agent (F) containing the flame-retardant organosilicon compound as a main component has a structure in which a phenyl group or a phenyl derivative group is bonded to a silicon atom, has an introduction ratio of the phenyl group or the phenyl derivative group into the silicon atom that is 30% or more, and includes an organosilicon compound (F3) that does not contain a bromine atom or a chlorine atom.

The flame-retardant polyester-based artificial hair preferably is made by further attaching a hydrophilic fiber treating agent.

Further, the flame-retardant polyester-based artificial hair preferably is of an uncrimped raw silk type, is doped and has a unifilar fiber fineness ranging from 10 dtex to 100 dtex.

Effects of the Invention

According to the present invention, by using an antimony compound with an average particle diameter ranging from 1.5 μm to 15 μm, a polyester-based artificial hair that maintains fiber properties such as heat resistance and strength/elongation of typical polyester fibers, and has excellent settability, touch feeling, and transparency, and exceedingly high flame retardancy can be obtained, because the particle diameter of the antimony compound is relatively large, a concealing power is in a low range, and aggregation, degradation of a hue, filament breakage and ununiformity of the flame retardancy hardly occur.

Moreover, in the flame-retardant polyester-based artificial hair, a smooth touch feeling, combing smoothness and antistatic properties also can be provided without losing the flame retardancy.

DESCRIPTION OF THE INVENTION

The flame-retardant polyester-based artificial hair of the present invention is a fiber that is formed by melt-spinning: polyester (A) made of at least one kind of polyalkylene terephthalate and copolyester that contains polyalkylene terephthalate as a main component; a composition obtained by melt-kneading a bromine-containing flame retardancy agent (B) and an antimony compound (C) with an average particle diameter ranging from 1.5 μm to 15 μm; and a composition containing at least one kind of a compound (D) selected from the group consisting of biscarbodiimide compounds; polycarbodiimide compounds; bisoxazoline compounds and isocyanate compounds.

As the polyalkylene terephthalate or the copolyester that contains polyalkylene terephthalate that is contained as a main component in the polyester (A) used in the present invention, for example, polyalkylene terephthalate such as polyethylene terephthalate, polypropylene terephthalate and polybutylene terephthalate, and/or copolyester that contains such polyalkylene terephthalate as a main component and also contains a small amount of a copolymerizing component are exemplified.

The "main component" means containing 80 mol % or more of polyalkylene terephthalate.

As the polyalkylene terephthalate, polyethylene terephthalate, polypropylene terephthalate and polybutylene terephthalate are particularly preferable in view of liability and costs.

As the copolymerizing component, for example, multivalent carboxylic acid such as isophthalic acid, orthophthalic acid, naphtalenedicarboxylic acid, paraphenylenedicarboxylic acid, trimellitic acid, pyromellitic acid, succinic acid, glutaric acid, adipic acid, suberic acid, azelaic acid, sebacic acid and dodecanedioic acid, derivatives thereof, dicarboxylic acid including a sulfonate salt such as 5-sodium sulfoisophthalic acid and 5-sodium sulfoisophthalic acid dihydroxyethyl, derivatives thereof, 1,2-propanediol, 1,3-propanediol, 1,4-butanediol, 1,6-hexanediol, neopentylglycol, 1,4-cyclohexanedimethanol, diethylene glycol, polyethylene glycol, trimethylol propane, pentaerythritol, 4-hydroxybenzoic acid, ε-caprolactone and the like are exemplified.

In the light of stability and convenience of operations, it generally is preferable to manufacture the copolyester by effecting a reaction by allowing a copolymer of terephthalic acid and/or its derivative (for example, ethyl terephthalate) as the main component and alkylene glycol to contain a small amount of the copolymerizing component, but it also is possible to manufacture by copolymerizing a mixture of terephthalic acid and/or its derivative (for example, methyl terephthalate) as the main component and alkylene glycol, in which a small amount of a monomer or oligomer component that is the copolymerizing component further is contained.

The copolyester may be a copolyester in which the copolymerizing component is polycondensed with a main chain and/or a side chain of the polyalkylene terephthalate that is the main component, and its copolymerizing method is not limited particularly.

Specific examples of the copolyester containing the polyalkylene terephthalate as the main component include: polyester that contains polyethylene terephthalate as the main component and is copolymerized with ethylene glycol ether of bisphenol A; polyester that is copolymerized with 1,4-cyclohexane dimethanol; polyester that is copolymerized with 5-sodium sulfoisophthalic acid dihydroxyethyl; and the like.

The polyalkylene terephthalate and the copolyester may be used alone or in combination of two kinds or more. Among them, polyethylene terephthalate, polypropylene terephthalate, polybutylene terephthalate,copolyester (polyester that contains polyethylene terephthalate as the main component and is copolymerized with ethylene glycol ether of bisphenol A, polyester that is copolymerized with 1,4-cyclohexane dimethanol, polyester that is copolymerized with 5-sodium sulfoisophthalic acid dihydroxyethyl, and the like) are preferable, and a mixture of two kinds or more of them also may be preferable.

An intrinsic viscosity of the polyester (A) preferably ranges from 0.5 to 1.4, and more preferably ranges from 0.6 to 1.2. In the case where the intrinsic viscosity of the polyester (A) is less than 0.5, sufficient shear cannot be obtained, the dispersivity of the antimony compound tends to deteriorate, and the mechanical strength of the obtained fiber tends to be decreased, on the other hand, the intrinsic viscosity is more than 1.4, the melt viscosity is increased in accordance with an increase of its molecular weight, the melt-spinning tends to be difficult, the fineness of the obtained fiber tends to be ununiform, and the dispersivity of the antimony compound tends to deteriorate.

The bromine-containing flame retardancy agent (B) used in the present invention is not limited particularly, and generally used bromine-containing flame retardancy agents may be used.

Specific examples of the bromine-containing flame retardancy agent (B) include: bromine-containing phosphoric esters such as pentabromotoluene, hexabromobenzene, decabromodiphenyl, decabromodiphenyl ether, bis(tribromophenoxy)ethane, tetrabromo phthalic anhydride, ethylenebis(tetrabromo phthalimide), ethylenebis(pentabromophenyl), octabromotrimethylphenyl indane and tris(tribromoneopentyl)phosphate; brominated polystyrenes represented by a general formula (9); brominated polybenzil acrylates represented by a general formula (10); brominated epoxy oligomers represented by a general formula (11); brominated phenoxy resins; brominated polycarbonate oligomers represented by a general formula (12); tetrabromobisphenol A; tetrabromobisphenol A derivatives such as tetrabromobisphenol A-bis(2,3-dibromopropyl ether), tetrabromobisphenol A-bis(arylether) and tetrabromobisphenol A-bis(hydroxyethyl ether); bromine-containing triazine-based compounds such as tris(tribromophenoxy)triazine; bromine-containing isocyanuric acid-based compounds such as tris(2,3-dibromopropyl)isocyanurate; and the like. They may be used alone or in combination of two kinds or more.

[Chemical Formula 9]

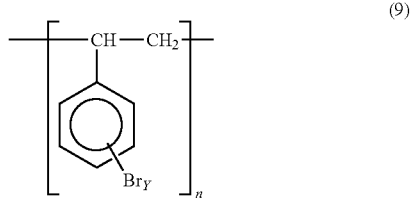

(9)

(where, in the formula, Y represents 1 to 5, and n represents 5 to 200)

[Chemical Formula 10]

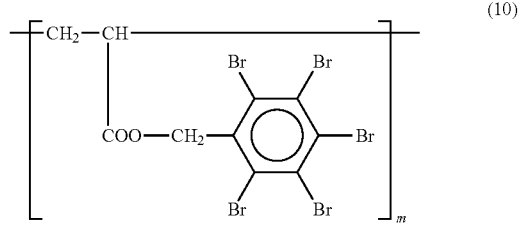

(10)

(where, in the formula, m represents 5 to 100).

[Chemical Formula 11]

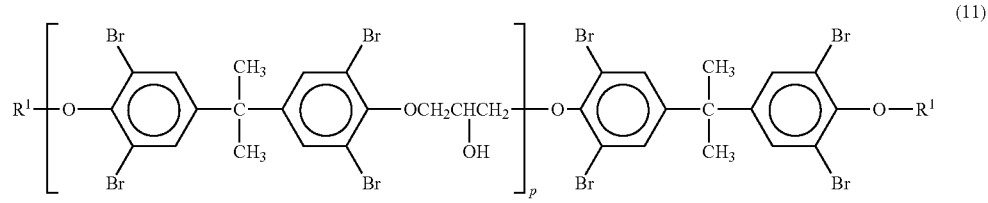

(11)

(where, in the formula, $R^1$ represents a hydrocarbon group with a carbon number ranging from 1 to 10, an aryl group, an aralkyl group, a hydrocarbon group containing a reactive group, a bromine-containing aryl group or a bromine-containing aralkyl group, which may be the same or different, and p represents 1 to 80)

[Chemical Formula 12]

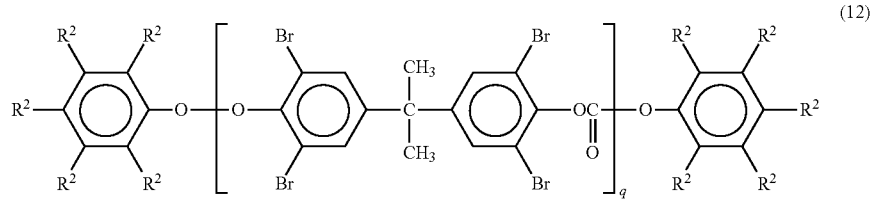

(12)

(where, in the formula, $R^2$ represents a hydrogen atom or a bromine atom, which may be the same or different, and q represents 1 to 80).

Among them, in the light of providing the flame retardancy, bromine-containing phosphoric ester-based flame retardancy agents, brominated polystyrene-based flame retardancy agents, brominated benzil acrylate-based flame retardancy agents, brominated epoxy-based flame retardancy agents, brominated phenoxy resin-based flame retardancy agents, brominated polycarbonate-based flame retardancy agents, tetrabromobisphenol A derivatives, bromine-containing triazine-based compounds and bromine-containing isocyanuric acid-based compounds are preferable. In the light of fiber properties, heat resistance and processing stability, bromine-containing phosphoric ester-based flame retardancy agents, brominated epoxy-based flame retardancy agents and brominated phenoxy resin-based flame retardancy agents are further preferable.

The amount of the bromine-containing flame retardancy agent (B) used in the present invention preferably ranges from 5 parts by weight to 30 parts by weight, more preferably ranges from 6 parts by weight to 25 parts by weight, and further preferably ranges from 7 parts by weight to 20 parts by weight with respect to 100 parts by weight of the polyester (A). When the used amount of the bromine-containing flame retardancy agent (B) is less than 5 parts by weight, the flame-retardant effect tends to be difficult to be obtained, and when it is more than 30 parts by weight, mechanical properties, heat resistance and drip resistance of the obtained fiber tend to deteriorate.

In the present invention, the flame retardancy can be generated by blending the bromine-containing flame retardancy agent (B), but in the case of using a silicone-based fiber treating agent (polyorganosiloxane-based fiber treating agent) and in the case of using with a flammable fiber mixed therewith, the sufficient flame retardancy may not be obtained, and by mixing the antimony compound (C), the flame-retardant effect is improved significantly, thereby obtaining the sufficient flame retardancy.

An average particle diameter of the antimony compound (C) of the present invention preferably ranges from 1.5 μm to 15 μm, more preferably ranges from 1.7 μm to 12 μm, and further preferably ranges from 1.9 μm to 10 μm. When the average particle diameter of the antimony compound (C) is less than 1.5 μm, a concealing power is high, transparency of the fiber is likely to be decreased, aggregation is likely to occur, and the transparency and spin processibility tend to be decreased. On the other hand, when it is more than 15 μm, touch feeling and the spin processibility tend to be decreased.

Specific examples of the antimony compound (C) to be used in the present invention include antimony trioxide, antimony tetraoxide, antimony pentaoxide, sodium antimonite and the like, and may be used alone or in combination of two kinds or more. Among them, sodium antimonite is preferable in the light of the spin processibility of the composition.

The antimony compound (C) to be used in the present invention may be subjected to surface treatment by using an epoxy compound, a silane compound, an isocyanate compound, a titanate compound or the like, as necessary.

The amount of the antimony compound (C) used in the present invention preferably ranges from 0.5 parts by weight to 10 parts by weight, more preferably ranges from 0.6 parts by weight to 9 parts by weight, and further preferably ranges from 0.7 parts by weight to 8 parts by weight, with respect to 100 parts by weight of the polyester (A). When the used amount of the antimony compound (C) is less than 0.5 parts by weight, improvement of the flame-retardant effect tends to be small, and when it is more than 10 parts by weight, the processing stability, appearance, the transparency tend to deteriorate.

In the present invention, by further blending at least one kind (D) selected from the group consisting of biscarbodiimide compounds; polycarbodiimide compounds; bisoxazoline compounds; and isocyanate compounds, the decrease of the melt viscosity in the case of melt-kneading the antimony compound can be compensated, and the fiber properties and the spin processibility can be stabilized.

The component (D) to be used in the present invention is not limited particularly, as long as it is at least one compound selected from the group consisting of biscarbodiimide compounds; polycarbodiimide compounds; bisoxazoline compounds; and isocyanate compounds.

Examples of the biscarbodiimide compounds; polycarbodiimide compound to be used in the present invention include; polycarbodiimides such as diphenyl carbodiimide, di-cyclohexyl carbodiimide, di-2,6-dimethylphenyl carbodiimide, diisopropyl carbodiimide, dioctyldecyl carbodiimide, di-o-triyl carbodiimide, N-triyl-N'-phenyl carbodiimide, N-triyl-N'-cyclohexyl carbodiimide, di-p-triyl carbodiimide, di-p-nitrophenyl carbodiimide, di-p-aminophenyl carbodiimide, di-p-hydroxyphenyl carbodiimide, di-p-chlorphenyl carbodiimide, di-o-chlorphenyl carbodiimide, di-3,4-dichlorphenyl carbodiimide, di-2,5-dichlorphenyl carbodiimide, p-phenylene-bis-o-triyl carbodiimide, p-phenylene-bis-dicyclohexyl carbodiimide, p-phenylene-bis-dicyclohexyl carbodiimide, p-phenylene-bis-di-p-chlorphenyl carbodiimide, hexamethylene-bis-dicyclohexyl carbodiimide, ethylene-bis-diphenyl carbodiimide, ethylene-bis-di-cyclohexyl carbodiimide, poly(1,6-hexamethylene carbodiimide), poly(4,4'-methylenebiscyclohexyl carbodiimide), poly(1,3- cyclohexylene carbodiimide) and poly(1,4-cyclohexylene carbodiimide); poly(4,4'-diphenylmethane carbodiimide); poly(3,3'-dimethyl-4,4'-diphenylmethane carbodiimide); poly(naphthylene carbodiimide); poly(p-phenylene carbodiimide); poly(m-phenylene carbodiimide); poly(tolylcarbodiimide), poly(diisopropylphenylene carbodiimide); poly(methyl-diisopropylphenylene carbodiimide); poly(triethylphenylene carbodiimide); poly(triisopropylphenylene carbodiimide); and the like, and as commercially available products, Stabagsol I and Stabagsol P (registered trademarks) produced by Bayer AG are exemplified. These carbodiimide compounds may be used alone or in combination of two kinds or more.

Examples of the bisoxazoline compound to be used in the present invention include: 2,2'-methylenebis(2-oxazoline); 2,2'-ethylenebis(2-oxazoline); 2,2'-ethylenebis(4-methyl-2-oxazoline); 2,2'-propylenebis(2-oxazoline); 2,2'-tetramethylenebis(2-oxazoline); 2,2'-hexamethylenebis(2-oxazoline); 2,2'-octamethylenebis(2-oxazoline); 2,2'-p-phenylenebis(2-oxazoline); 2,2'-p-phenylenebis(4-methyl-2-oxazoline); 2,2'-p-phenylenebis(4,4-dimethyl-2-oxazoline); 2,2'-p-phenylenebis(4-phenyl-2-oxazoline); 2,2'-m-phenylenebis(2-oxazoline); 2,2'-m-phenylenebis(4-methyl-2-oxazoline); 2,2'-m-phenylenebis(4,4-dimethyl-2-oxazoline); 2,2'-m-phenylenebis(4-phenyl-2-oxazoline); 2,2'-o-phenylenebis(2-oxazoline); 2,2'-phenylbis(4-methyl-2-oxazoline); 2,2'-bis(2-oxazoline); 2,2'-bis(4-methyl-2-oxazoline); 2,2'-bis(4-methyl-2-oxazoline); 2,2'-bis(4-phenyl-2-oxazoline); and the like. These oxazoline compounds may be used alone or in combination of two kinds or more.

Examples of the isocyanate compound to be used in the present invention include: 1,3-trimethylene diisocyanate; 1,4-tetramethylene diisocyanate; 1,6-hexamethylene diisocyanate; 1,9-nonamethylene diisocyanate; 1,10-decamethylene diisocyanate; 1,12-dodecamethylene diisocyanate; hexamethylene diisocyanate-biuret; 2,2,4-trimethylhexamethylene diisocyanate; 2,4,4-trimethylhexamethylene diisocyanate; isophorone diisocyanate; 1,4-cyclohexane diisocyanate; 4,4'-dicyclohexylmethane diisocyanate; hydrogenated xylylene diisocyanate; 2,2'-diethylether diisocyanate; p-phenylene diisocyanate; tolylene diisocyanate; xylylene diisocyanate; 4,4'-diphenyl diisocyanate; 1,5-naphthalene diisocyanate; 4,4'-diphenylmethane diisocyanate; 3,3'-methyleneditolylene-4,4'-diisocyanate; tolylene diisocyanate trimethylol propane adducts; triphenylmethane triisocyanate; 4,4'-diphenylether diisocyanate; tetrachlorophenylene diisocyanate; 3,3'-dichloro-4,4'-diphenylmethane diisocyanate; triisocyanate phenylthiophosphate; and the like. These isocyanate compounds may be used alone or in combination of two kinds or more.

Among them, aromatic polycarbodiimides such as poly(4,4'-diphenylmethane carbodiimide), poly(3,3'-dimethyl-4,4'-diphenylmethane carbodiimide), poly(naphthylene carbodiimide), poly(p-phenylene carbodiimide), poly(m-phenylene carbodiimide), poly(tolylcarbodiimide), poly(diisopropylphenylene carbodiimide), poly(methyl-diisopropylphenylene carbodiimide), poly(triethylphenylene carbodiimide) and poly(triisopropylphenylene carbodiimide), and aromatic bisoxazolines such as 2,2'-p-phenylenebis(2-oxazoline), 2,2'-p-phenylenebis(4-methyl-2-oxazoline), 2,2'-p-phenylenebis(4,4-dimethyl-2-oxazoline), 2,2'-p-phenylenebis(4-phenyl-2-oxazoline), 2,2'-m-phenylenebis(2-oxazoline), 2,2'-m-phenylenebis(4-methyl-2-oxazoline), 2,2'-m-phenylenebis(4,4-dimethyl-2-oxazoline), 2,2'-m-phenylenebis(4-phenyl-2-oxazoline) and 2,2'-o-phenylenebis(2-oxazoline) are preferable, in the light of suppressing the decrease of the melt viscosity, securing the processing stability, suppressing bleeding of the flame retardancy agent and the like.

The amount of the at least one kind (D) selected from the group consisting of biscarbodiimide compounds; polycarbodiimide compounds, bisoxazoline compounds and isocyanate compounds used in the present invention preferably ranges from 0.05 parts by weight to 10 parts by weight, more preferably 0.1 parts by weight to 8 parts by weight, and further preferably 0.2 parts by weight to 6 parts by weight with respect to 100 parts by weight of the polyester (A). When the used amount of the at least one kind (D) selected from the group consisting of biscarbodiimide compounds; polycarbodiimide compounds, bisoxazoline compounds and isocyanate compounds is less than 0.05 parts by weight, the effect of suppressing flowability and bleeding tends to be decreased, and when it is more than 10 parts by weight, the flame retardancy and the mechanical strength of the flame-retardant polyester-based artificial hair tend to be decreased.

A limiting oxygen index (LOI) of the flame-retardant polyester-based resin composition of the present invention preferably is 28 or more, and more preferably is 30 or more. In the below-described attachment of the polyorganosiloxane-based fiber treating agent (E) to the flame-retardant polyester-based fiber, the fiber treating agent (E) is attached to a surface of the flame-retardant polyester-based fiber. Thus, in the case where a flame is contacted with a fiber using the polyorganosiloxane-based fiber treating agent (E), the flame spreads on the surface of the fiber, and then the fiber itself is burned out. Since the commonly used flame-retardant polyester fiber containing phosphorus adopts a mechanism to secure the flame retardancy by dripping, it is difficult to extinguish the flame that is spreading out on the surface of the fiber. Moreover, in the case where a flame is contact with the polyester fiber that is subjected to after processing by using the bromine-containing flame retardancy agent such that the flame retardancy is provided thereto, the bromine-containing flame retardancy agent is thermal-decomposed and a bromine gas is generated, and thus the flame on the surface of the fiber can be extinguished. However, since the properties as the artificial hair such as a touch feeling, combing smoothness and curl property are inferior significantly, its use is difficult. In the present invention, it can be found that, by using the polyester fiber that is formed of a composition obtained by melt-kneading the bromine-containing flame retardancy agent (B) as the flame retardancy agent and the antimony compound (C) as the flame-retardant aid with respect to polyester (A), the touch feeling, the combing smoothness and the like are improved, and even in the case of suppressing an attached amount of the polyorganosiloxane-based fiber treating agent (E) to be used to be small and using the polyorganosiloxane-based fiber treating agent (E), the flame retardancy can be maintained. However, when the LOI of the flame-retardant polyester-based fiber is less than 28, in the case of attaching the polyorganosiloxane-based fiber treating agent (E), the sufficient flame retardancy tends not to be obtained.

The flame-retardant polyester-based resin composition of the present invention can contain various kinds of additives such as a heat resistance agent, a light stabilizing agent, a fluorescent agent, an antioxidant, an antistatic agent, a pigment, a plasticizer and a lubricant, as necessary. By containing the pigment, a doped fiber can be obtained.

The polyester-based composition used in the present invention can be manufactured by dry-blending the polyester (A), the bromine-containing flame retardancy agent (B), the antimony compound (C), and at least one kind of a compound (D) selected from the group consisting of: biscarbodiimide compound; polycarbodiimide compounds; bisoxazoline compounds; and isocyanate compounds, and thereafter melt-kneading them by using various common kneading machines.

Examples of the kneading machine include a monoaxial extruder, a biaxial extruder, a roll, a Banbury mixer, a kneader and the like. Among them, the biaxial extruder is preferable in the light of adjustment of a degree of the kneading and convenience of its operation.

For example, a cylinder set temperature is made to be in a range from 260° C. to 300° C. by using the biaxial extruder with a screw diameter of 45 mm, the melt-kneading is performed at a discharge amount ranging from 50 kg/hr to 150 kg/hr and the number of rotation of the screw ranging from 150 rpm to 200 rpm, a strand is drawn from a dice, water cooling is performed, and thereafter, pelletization is performed by using a strand cutter, thereby obtaining the composition of the present invention.

The polyester-based artificial hair of the present invention can be manufactured by melt-spinning the polyester-based composition by a common melt-spinning method.

For example, temperatures of the extruder, a gear pump, a pump adaptor and the like are made to be in a range from 270° C. to 310° C. so as to perform the melt-spinning, and a line of a spun filament is passed through a heating cylinder, and thereafter, it is cooled down to be a glass transition point or less and is drawn at a speed ranging from 50 m/min to 500 m/min, thereby obtaining the line of the spun filament. Moreover, the line of the spun filament also can be cooled down in a water bath that is filled with cooling water so as to control its fineness. The temperature and a length of the heating cylinder, a temperature and a spraying amount of cooling air, a temperature of the cooling water bath, a cooling time and a drawing speed can be adjusted appropriately according to the discharge amount and the number of the pump adaptors.

The obtained line of the spun filament is subjected to heat drawing, but the drawing may be performed by either of a two-steps method of winding up the line of the spun filament once and drawing, and a direct spinning and drawing method of continuously drawing without winding up. The heat drawing is performed by a multi-step drawing method of a single-step drawing method or a drawing method with double steps or more. As a heating means in the heat drawing, a heating roller, a heat plate, a steam jet machine, a warm water bath and the like can be used, and they also may be used in combination appropriately. A drawing temperature preferably is higher than a glass transition temperature (Tg) of the polyester serving as a base, which ranges from 50° C. to 100° C.

A cross-sectional shape of the fiber of the present invention may be a perfect circle-shape, but also may be a cocoon-shape or a shape that is obtained by connecting two or more circles or ellipses. In the case of the shape that is obtained by connecting two or more circles or ellipses, it is preferable that the two or more circles or ellipses are overlapped partly, or in the case of the shape in which they are in touch with each other, they are overlapped partly, or the two or more circles or ellipses that are in touch with each other are arranged linearly and is symmetrical bilaterally.

The flame-retardant polyester-based artificial hair of the present invention that is obtained as described above is a fiber of an uncrimped raw silk type, and generally, its fineness preferably ranges from 10 dtex to 100 dtex and more preferably ranges from 20 dtex to 90 dtex for the artificial hair. Moreover, the artificial hair preferably has heat resistance for allowing use of a heating appliance for beauty treatment (a hair iron) at a temperature ranging from 160° C. to 200° C., is not likely to be ignited, and has a self-extinguishing property.

In the case where the polyester-based artificial hair of the present invention is doped, it can be used directly, but in the case where it is not doped, it can be dyed under conditions that are similar to those of a typical polyester-based fiber. A pigment, a dye and an aid to be used for dying preferably have weather resistance and flame retardancy.

In the present invention, by attaching the polyorganosiloxane-based fiber treating agent (E) to the flame-retardant polyester-based fiber, an artificial hair to which the excellent touch feeling and combing smoothness are provided without losing the flame retardancy can be obtained.

As the polyorganosiloxane-based fiber treating agent (E) to be used in the present invention, commonly used polyorganosiloxane-based fiber treating agents can be used.

Specific examples of the polyorganosiloxane-based fiber treating agent of the present invention include:

diorganosilicones having a structural unit represented by a general formula (1), such as,

[Chemical Formula 13]

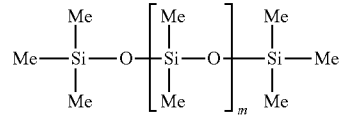

(where, in the formula, Me represents a methyl group, and m represents an integer ranging from 50 to 200),

[Chemical Formula 14]

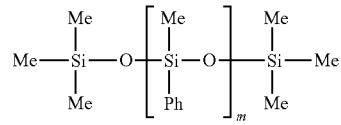

(where, in the formula, Me represents a methyl group, Ph represents a phenyl group or a phenyl derivative group, and m represents an integer ranging from 50 to 200),

[Chemical Formula 15]

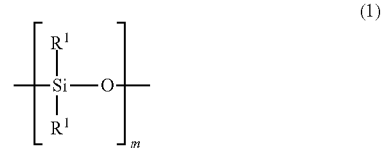

(where, in the formula, each $R^1$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, and m represents an integer ranging from 4 to 200);

and polyorganosiloxanes in which an alkylene oxide structure is included in the main chain represented by a general formula (2), such as,

[Chemical Formula 16]

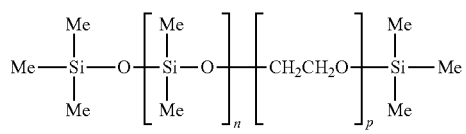

(where, in the formula, Me represents a methyl group, and n and p represent integers ranging from 2 to 150, respectively),

[Chemical Formula 17]

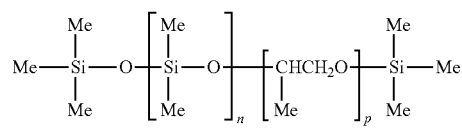

(where, in the formula, Me represents a methyl group, and n and p represent integers ranging from 2 to 150, respectively),

[Chemical Formula 18]

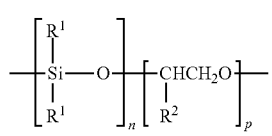

(2)

(where, in the formula, each of $R^1$ and $R^2$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, and n and p represent integers ranging from 2 to 150, respectively).

An attaching amount of the polyorganosiloxane-based fiber treating agent (E) in the present invention preferably ranges from 0.01% omf to 1% omf, more preferably ranges from 0.03% omf to 0.9% omf, and further preferably ranges from 0.05% omf to 0.8% omf. When the attaching amount of the polyorganosiloxane-based fiber treating agent (E) is less than 0.01% omf, the touch feeling and the combing smoothness tend to be decreased, and when it is more than 1% omf, an attaching amount of the fiber treating agent is too large, the touch feeling tends to be tacky, and processing into a headdressing product tends to be difficult because the fiber is too smooth.

In the present invention, by attaching the fiber treating agent made of the polyorganosiloxane (E1) having reactivity and the hardening agent (E2), a crosslinked coat is formed on the surface of the fiber, and not only the touch feeling and the combing smoothness but also durability and shampoo resistance can be improved.

As the polyorganosiloxane (E1) having the reactivity used in the present invention, commonly used polyorganosiloxane having reactivity can be used.

Specific examples of the polyorganosiloxane (E1) having the reactivity include:

polyorganosiloxanes having a structural unit represented by a general formula (3), such as,

[Chemical Formula 19]

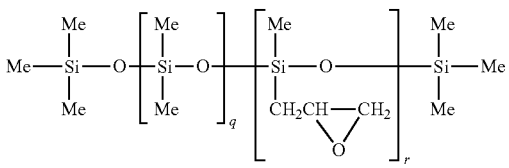

(where, in the formula, Me represents a methyl group, and q and r represent integers ranging from 2 to 150, respectively),

[Chemical Formula 20]

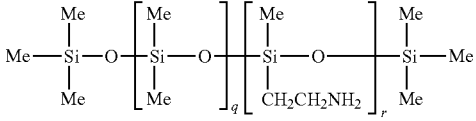

(where, in the formula, Me represents a methyl group, and q and r represent integers ranging from 2 to 150, respectively),

[Chemical Formula 21]

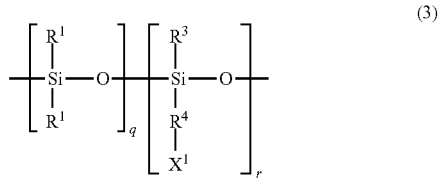

(3)

(where, in the formula, each of $R^2$ and $R^4$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, $R^5$ represents an alkylene group with a carbon number ranging from 1 to 20 or an alkyleneoxy group with a carbon number ranging from 1 to 80, which has a straight chain or a branch, $X^1$ represents a hydroxy group, an epoxy group or an amino group, and q and r represent integers ranging from 2 to 150, respectively);

polyorganosiloxanes having a structural unit represented by a general formula (4), such as,

[Chemical Formula 22]

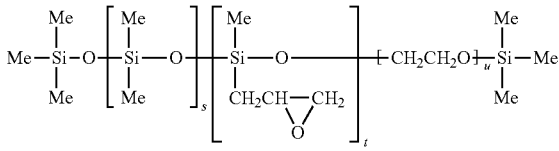

(where, in the formula, Me represents a methyl group, and s, t and u represent integers ranging from 2 to 100, respectively),

[Chemical Formula 23]

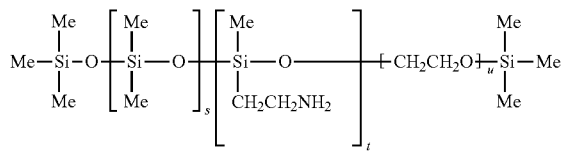

(where, in the formula, Me represents a methyl group, and s, t and u represent integers ranging from 2 to 100, respectively),

[Chemical Formula 24]

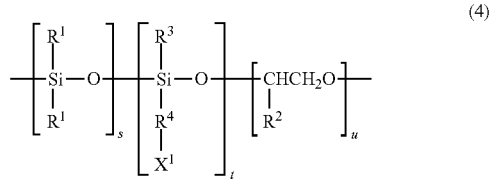

(4)

(where, in the formula, each of $R^1$, $R^2$ and $R^3$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, $R^4$ represents an alkylene group with a carbon number ranging from 1 to 20 or an alkyleneoxy group with a carbon number ranging from 1 to 80, which has a straight chain or a branch, $X^1$ represents a hydroxy group, an epoxy group or an amino group, and s, t and u represent integers ranging from 2 to 100, respectively);

and polyorganosiloxanes having a structural subunit represented by a general formula (5), such as,

[Chemical Formula 25]

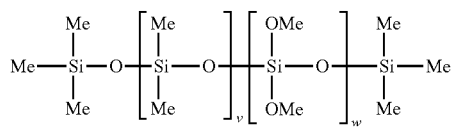

[Chemical Formula 26]

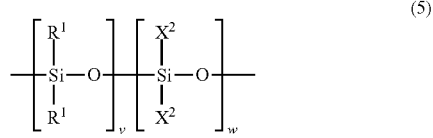

(5)

(where, in the formula, each $R^1$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, each $X^2$ is independent and represents a hydroxy group, an alkoxy group, a phenoxy group, a thioalkoxy group, an acyloxy group, an aminoxy group, a ketoximate group, an amino group, an amide group or an alkenyloxy group, and v and w represent integers ranging from 2 to 100, respectively).

As the hardening agent (E2) to be used in the present invention, a compound that has at least two reactive groups selected from the group consisting of an epoxy group, an amino group and an isocyanate group in one molecule, and/or a silane coupling agent may be used.

Specific examples of the hardening agent (E2) include: compounds having an epoxy group such as ethyleneglycol diglycidylether, diethyleneglycol diglycidylether, triethyleneglycol diglycidylether, polyethyleneglycol diglycidylether, propyleneglycol diglycidylether, dipropyleneglycol diglycidylether, tripropyleneglycol diglycidylether, polypropyleneglycol diglycidylether, neopentylglycol diglycidylether, 1,6-hexanediol diglycidylether, 2,2-bis(4-hydroxyphenyl)propane diglycidylether, bis(4-hydroxyphenyl) methane diglycidylether, 1,1-bis(4-hydroxyphenyl)ethane diglycidylether, 2,2-bis(4-hydroxycyclohexyl)propane diglycidylether, 3,3',5,5'-tetramethyl-4,4'-dihydroxybiphenyl diglycidylether, 2,2'-bis(4-(β-hydroxypropoxy)phenyl)propane diglycidylether, 3,4-epoxycyclohexylmethyl, 3,4-epoxycyclohexane carboxylate and vinylcyclohexene dioxide; compounds having an amino group such as ethylene diamine, 1,3-propylene diamine, tetramethylene diamine, pentamethylene diamine, hexamethylene diamine, octamethylene diamine, decamethylene diamine, undecamethylene diamine, dodecamethylene diamine, paraxylene diamine, 2,2,4-trimethylhexamethylene diamine, 2,4,4-trimethylhexamethylene diamine and 3-methylpentamethylene diamine; compounds having an isocyanate group such as 1,6-hexamethylene diisocyanate, 1,12-dodecamethylene diisocyanate, 2,2,4-trimethylhexamethylene diisocyanate, 2,4,4-trimethylhexamethylene diisocyanate, isophorone diisocyanate, 1,4-cyclohexane diisocyanate, 4,4'-dicyclohexylmethane diisocyanate, hydrogenated xylylene diisocyanate, p-phenylene diisocyanate, tolylene diisocyanate, xylylene diisocyanate, 4,4'-diphenyl diisocyanate, 1,5-naphthalene diisocyanate, 4,4'-diphenylmethane diisocyanate, triphenylmethane triisocyanate and 4,4'-diphenylether diisocyanate; and silane coupling agents such as amino group-containing silane coupling agents and epoxy group-containing silane coupling agents.

In the present invention, the combination of the polyorganosiloxane (E1) having the reactivity with the hardening agent (E2) preferably is a combination of the epoxy modified polyorganosiloxane and/or amino modified polyorganosiloxane with a glycidylether compound, a silane coupling agent or a compound having an isocyanate group, in view of improving effects for ease of the formation of the crosslinked coat, the touch feeling and the combing smoothness, and the durability.

A component ratio of the polyorganosiloxane (E1) having the reactivity and the hardening agent (E2) in the present invention: (E1)/(E2) preferably ranges from 100/0 to 70/30, more preferably ranges from 95/5 to 75/25, and further preferably ranges from 90/10 to 80/10 in weight ratio.

In the present invention, by attaching the fiber treating agent (F) containing a flame-retardant organosilicon compound as the polyorganosiloxane-based fiber treating agent, the excellent touch feeling, smoothness and combing smoothness can be provided to the flame-retardant polyester-based fiber without losing the flame retardancy.

The fiber treating agent (F) containing the flame-retardant organosilicon compound to be used in the present invention is a fiber treating agent that contains; an organosilicon compound (F1) having an organic group in which the organic group containing a bromine atom is bonded to a silicon atom via a carbon atom; and/or an organosilicon compound (F2) having an organic group in which the organic group containing a chlorine atom is bonded to a silicon atom via a carbon atom, and is a fiber treating agent that has an organic group in which a phenyl group or a phenyl derivative group is bonded to a silicon atom, and contains an organosilicon compound (F3) that does not contain a bromine atom and a chlorine atom.

The organosilicon compound (F1) and/or (F2) of the present invention preferably has a structure represented by a general formula (6), and includes at least one of an alkyl group or an aromatic hydrocarbon group that contains at least one bromine or chlorine.

[Chemical Formula 27]

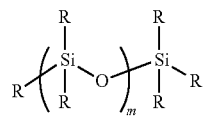

(6)

(where, in the structural formula, R represents a group selected from an alkyl group with a carbon number ranging from 1 to 6 or an aromatic hydrocarbon group with a carbon number ranging from 6 to 15 that contains at least one bromine or chlorine, a hydrogen atom and an alkoxyl group, and m represents an integer of 0 or larger).

As the substituent R contained in the organosilicon compound (F1) or (F2) of the present invention, a methyl group, an ethyl group, a propyl group, a butyl group, a pentyl group, a cyclohexyl group, a phenyl group, a phenyl derivative group and the like are exemplified, and all of the substituents are not necessarily to be the same Among them, the methyl group provides the smoothest touch feeling, but the methyl group may be combined with the other groups. It is preferable that at least 50% of the substituents are methyl groups.

A total content of the bromine and the chlorine in the organosilicon compound (F1) or (F2) of the present invention preferably ranges from 10 wt % to 50 wt %, and more preferably ranges from 20 wt % to 50 wt %, where (F1) or (F2) is assumed to be 100 wt %. Herein, the content of the bromine atom or the chlorine atom was calculated by measuring a fluorescent X-ray intensity of the chlorine atom or the bromine atom using Automatic X-ray Fluoresecnce Spectromter RIX3000 produced by Rigaku Industrial Corp.

The organosilicon compound (F1) and/or (F2) of the present invention more preferably includes a phenyl group with a structure represented by a general formula (7),

[Chemical Formula 28]

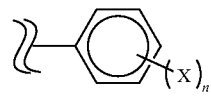

(7)

(where, in the structural formula, X represents Br or Cl, and n represents an integer ranging from 1 to 3).

The organosilicon compound (F1) and/or (F2) of the present invention further preferably includes a phenyl derivative group with a structure represented by a general formula (8),

[Chemical Formula 29]

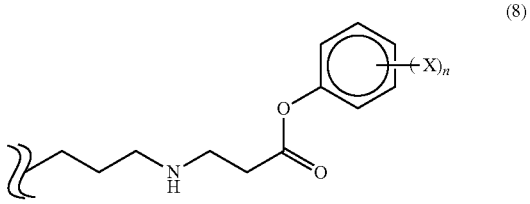

(8)

(where, in the structural formula, X represents Br or Cl, and n represents an integer ranging from 1 to 3).

A total content of the organosilicon compound (F1) and/or (F2) in the fiber treating agent (F) of the present invention that contains a flame-retardant organosilicon compound preferably ranges from 10 wt % to 70 wt %, more preferably ranges from 15 wt % to 65 wt %, and further preferably ranges from 20 wt % to 50 wt % in order to obtain both of the excellent flame retardancy and the excellent touch feeling, where a total amount of (F) is assumed to be 100 wt %. When the total content of the organosilicon compound (F1) and/or (F2) is less than 10%, the flame retardancy tends to be insufficient, and when it is more than 70 wt %, the excellent touch feeling that is specific to silicone tends to be insufficient.

(F1) and/or (F2) of the present invention can be obtained by (1) an addition reaction between: an organosilicon compound that has an amino group; and a halogen atom-containing organic compound that has a vinyl group, (2) an addition reaction between: an organosilicon compound having a hydrogen atom that is connected to a silicon atom directly; and a halogen atom-containing organic compound that has a vinyl group, (3) an addition reaction between: an organosilicon compound that has an amino group; and a halogen atom-containing organic compound that has an epoxy group or the like.

(1) The addition reaction between: an organosilicon compound having an amino group; and a halogen atom-containing organic compound that has a vinyl group is a reaction in which the amino group in the organosilicon compound having the amino group and the vinyl group in the halogen atom-containing organic compound having the vinyl group are added so as to be bonded chemically to each other. This addition reaction proceeds by stirring for about 5 hours under heating conditions at about 80° C. without using a catalyst.

(2) The addition reaction between: an organosilicon compound having a hydrogen atom that is connected to a silicon atom; and a halogen atom-containing organic compound having a vinyl group proceeds easily by stirring for about 5 hours under heating conditions at about 100° C., in the presence of a catalyst that is represented by a platinum catalyst and generally is called a catalyst for a hydrosilylization reaction.

(3) The addition reaction between: an organosilicon compound that has an amino group; and a halogen atom-containing organic compound having an epoxy group undergoes by the organosilicon compound having the amino group and the halogen atom-containing organic compound having the epoxy group.

The organosilicon compound (F3) of the present invention is an organosilicon compound that does not contain a bromine atom or a chlorine atom, but contains at least one organic group in which a phenyl group or a phenyl derivative group is bonded to the silicon atom. Examples of the organic group other than the phenyl group include a methyl group, an ethyl group, a propyl group, a butyl group, a pentyl group, a cyclohexyl group, a vinyl group, an allyl group, a 3,3,3-trifluoropropyl group and the like. As these organic groups other than the phenyl group and the phenyl derivative group, a methyl group is preferable because the smoothness can be highest, but the methyl group may be combined with other organic groups.

An introduction rate of the phenyl group and the phenyl derivative group in the organosilicon compound (F3) of the present invention (hereinafter, it may be called a phenyl introduction rate) preferably is 30% or more, and more preferably ranges from 50% to 80%, where the total number of the organic groups that are bonded to the silicon atom is assumed to be 100%. Incidentally, the introduction rate of the phenyl group or the phenyl derivative group was calculated by performing a $^1$H-NMR analysis using a FT-NMR Spectrometer JNM-AL400 produced by JEOL Ltd. and reading out structures and the number of the substituent organic groups from the chemical shift.

A content of the organosilicon compound (F3) in the fiber treating agent (F) that contains the flame-retardant organosilicon compound of the present invention preferably ranges from 10 wt % to 70 wt %, and more preferably ranges from 40 wt % to 70 wt % in order to obtain both of the excellent flame retardancy and the excellent touch feeling, where a total amount of (F) is assumed to be 100 wt %. When the content of the organosilicon compound (F3) is less than 10 wt %, the flame retardancy tends to be insufficient, and when it is more than 70 wt %, the excellent touch feeling that is specific to silicone tends to be insufficient.

The polyorganosiloxane-based fiber treating agent (E) of the present invention can contain dimethyl polysiloxane, methylphenyl polysiloxane, methyl hydrogen polysiloxane, diorgano polysiloxane diol, fluorosiloxane, alkyl modified siloxane, higher fatty acid modified siloxane, amino modified siloxane, epoxy modified siloxane and the like as other component as necessary in order to improve the touch feeling, but the present invention is not limited to them.

To the polyorganosiloxane-based fiber treating agent (E) of the present invention, at least one kind selected from the group consisting of polyoxyalkylene alkylether, polyoxyalkylene alkenylether, polyoxyalkylene arylether, polyoxyalkylene alkylarylether, random copolyethers of them, polyoxyalkylene alkylester, polyoxyalkylene alkenylester and polyoxyalkylene alkylarylester; polyoxyalkylene alkylamine; N,N-dihydroxyethyl alkylamide; polyoxyalkylene alkylamide; glycerine fatty acid ester; polyglyceryl fatty acid ester; pentaerythritol fatty acid ester; polyoxyalkylene pentaerythritol alkyl ester; sorbitan fatty acid ester; polyoxyalkylene sorbitan fatty acid ester; sucrose fatty acid ester; polyoxyalkylene sucrose fatty acid ester; polyoxyalkylene; alkylamine salt; alkylammonium salt; alkylaralkyl ammonium salt; alkylpyridinium salt; alkylpicolinium salt; fatty acid salt; rosin acid salt; sulfated fatty acid salt; alkylsulfonate salt; alkylbenzene sulfonate salt; alkylnaphthalene sulfonate salt; alkylsulfo fatty acid ester salt; dialkyl sulfosuccinate salt; polyoxyalkylene alkylether sulfosuccinate monoester salt; polyoxyalkylene alkenylether sulfosuccinate monoester salt; polyoxyalkylene arylether sulfosuccinate monoester salt; alkyldiphenylether disulfonate salt; sulfated oil; sulfated fatty acid ester salt; alkyl sulfate salt; alkenyl sulfate salt; polyoxyalkylene alkylether sulfate salt; polyoxyalkylene alkylether carboxylate salt; polyoxyalkylene alkenylether sulfate salt; polyoxyalkylene arylether sulfate salt; and the like also can be added as necessary in order to provide appropriate wettability.

In the present invention, a hydrophilic fiber treating agent further is attached to the flame-retardant polyester fiber so as to provide an antistatic property and the like.

As the hydrophilic fiber treating agent of the present invention, commonly used hydrophilic fiber treating agents can be used. Specific examples of the hydrophilic fiber treating agent include a mixture of polyoxyalkylene alkylether, polyoxyalkylene alkylester, polyoxyalkylene alkylamine, N,N-dihydroxyethyl alkylamide, polyoxyalkylene alkylamide, polyglycerine fatty acid ester, polyoxyalkylene pentaerythritol alkyl ester, polyoxyalkylene sorbitan fatty acid ester, polyoxyalkylene, alkylamine salt, alkylammonium salt, alkylaralkyl ammonium salt, alkylpyridinium salt, alkylpicolinium salt, alkylsulfonate salt, alkylbenzene sulfonate salt, alkylnaphthalene sulfonate salt, alkylsulfo fatty acid ester salt, alkyl sulfate salt, alkenyl sulfate salt, polyoxyalkylene alkylether sulfate salt, polyoxyalkylene alkylether carboxylate salt, polyoxyalkylene alkenylether sulfate salt, or alkyl phosphate salt, with an ionic surfactant and the like. They may be used alone or in combination of two kinds or more.

An attaching amount of the hydrophilic fiber treating agent of the present invention preferably ranges from 0.01% omf to 1% omf, more preferably ranges from 0.03% omf to 0.8% omf, and further preferably ranges from 0.05% omf to 0.6% omf. When the attaching amount of the hydrophilic fiber treating agent is less than 0.01% omf, the antistatic property is low, and static electricity tends to be generated. On the other hand, when it is more than 1% omf, the touch feeling tends to be tacky.

As a treating method by the organosiloxane-based fiber treating agent (E) to the flame-retardant polyester-based fiber, common treating methods can be applied. For example, the organosiloxane-based fiber treating agent (E) is diluted with water so as to obtain a desired attaching amount, is attached uniformly on the surface of the flame-retardant polyester-based fiber by a below-described attachment method, is dried, and further is subjected to heat treatment, thereby fixing the organosiloxane-based fiber treating agent (E) on the surface of the flame-retardant polyester-based fiber firmly. The attachment method of the present invention is not limited particularly, as long as it is a method that enables the uniform attachment such as a dip-nip method, a spray applying method and a pick up roller applying method.

The treatment by the fiber treating agent of the present invention may be performed by continuous processing that is performed subsequently to the drawing and the heat treatment step at the time of manufacturing the flame-retardant polyester-based fiber, or may be performed by batch processing with respect to the flame-retardant polyester-based fiber after being manufactured.

The polyester-based artificial hair of the present invention has an excellent curl setting property by using a heating appliance for beauty treatment (a hair iron) and excellent curl retention, and thus can be used as the artificial hair. Further, by using oil such as a fiber surface treating agent and a softening agent, a touch feeling and a texture can be provided so as to imitate a human hair.

Moreover, the flame-retardant polyester-based artificial hair of the present invention may be used with other artificial hair material such as a modaacrylic fiber, a polyvinyl chloride fiber and a nylon fiber, and may be used with a human hair.

EXAMPLES

Next, the present invention will be described more specifically by way of examples, but the present invention is not limited to these.

A measurement method and an evaluation method of characteristic values are as follows.

(Spin Processibility)

As spin processibility, properties of an undrawn filament obtained by spinning were evaluated by visually observing and hand-touching the filament.

A: obtaining the undrawn filament having excellent properties with no filament breakage B: obtaining the undrawn filament with slight filament breakage C: obtaining the undrawn filament with filament breakage or the undrawn filament that was fraying (Strength and Elongation)

By using a tensile compression tester (produced by INTESCO co., Ltd., INTESCO Model201 type), a tensile strength/elongation of the filament was measured. One filament having a length of 40 mm was taken, both ends of 10 mm of the filament were sandwiched by paper boards (thin papers) to which double-side tapes with an adhesive agent pasted thereon were attached, and was dried by air overnight, thereby manufacturing a sample with a length of 20 mm. The sample was set in the tester, and a test was performed at a temperature of 24° C., a humidity of 80% or less, a load of $3.4 \times 10^{-3}$ N×fineness (dtex) and a tensile speed of 20 mm/min, the tensile strength and elongation at the time of breakage were measured. The test was repeated ten times under the same conditions, and an average value was adopted as the tensile strength/elongation of the filament.

(Transparency)

A tow filament with a length of 30 cm and a total fineness of 100,000 dtex was evaluated by being compared with a standard filament (a tow filament with a total fineness of 100,000 dtex made of polyethylene terephthalate), by visual observation in the sunlight.

A: having the same level as the standard filament

B: having a slight turbidity compared with the standard filament

C: having an obvious turbidity compared with the standard filament (Touch Feeling)

A tow filament with a length of 30 cm and a total fineness of 100,000 dtex was touched by a hand, thereby evaluating tackiness of a surface of the filament.

A: excellent smooth touch feeling

B: no tackiness

C: slightly tacky

D: tacky (Combing Smoothness)

A fiber treating agent was attached to a tow filament with a length of 30 cm and a total fineness of 100,000 dtex. The treated tow filament was combed (using a comb made of a Delrin resin), whereby combing smoothness was evaluated.

A: having no resistance at all (significantly light)

B: having almost no resistance (light)

C: having slight resistance (heavy)

D: having significant resistance or being stuck part way (Antistatic Property)

A tow filament with a length of 30 cm and a total fineness of 100,000 dtex was let stand still in a constant temperature and humidity room at a temperature of 25° C. and a humidity of 40% for 24 hours, thereafter, a top part of the tow filament was held by a hand so as to be hung vertically, and a comb (NEW DELRIN COMB No. 826) was passed from 3 cm from a top of the tow filament to a bottom end of the tow filament at a speed of 0.3 m/s thirty times or more. At this time, a condition of the tow filament was observed.

A: not changed (the tow was not expanded because of no electrification by static electricity)

B: several filaments were bounced toward outside

C: several tens of filaments were bounced toward outside because of static electricity D: the whole tow was expanded because of static electricity (Flame Retardancy)

A tow filament with a fineness of about 50 dtex was cut to have a length of 150 mm, 0.7 g of the tow filament was tied in a bundle, and one end thereof was pinched by a damp so as to be fixed to a stand and was hung vertically. A flame of 20 mm was contact with the fixed filament having an effective length of 120 mm for 3 seconds, and was burned, thereby performing an evaluation.

-Flammability-

A: lingering flame time was 0 second (not ignited)

B: lingering flame time was less than 3 seconds

C: lingering flame time was in a range from 3 seconds to 10 seconds

D: lingering flame time was more than 10 seconds

-Drip resistance-

A: the number of drips before the extinction was 0

B: the number of drips before the extinction was 5 or less

C: the number of drips before the extinction was in a range from 6 to 10

D: the number of drips before the extinction was more than 11

(Limiting Oxygen Index LOI)

A filament of 16 cm/0.25 g was weighed, and ends thereof were tied lightly by a double-side tape, were pinched by clamps and were twisted. After twisting sufficiently, the sample was folded in two at a middle thereof, which were then twisted. An end thereof was fixed by a Cellophane (registered trademark) tape such that a total length was 7 cm. The obtained sample was pre-dried at 105° C. for 60 minutes, and further was dried in a desiccator for 30 minutes or more.

The dried sample was ignited from its top part by an igniter which had an oxygen concentration adjusted to be a predetermined value and was narrowed to have a length ranging from 8 mm to 12 mm after 40 seconds, and the igniter was apart from the sample after the ignition. The oxygen concentration after flaming with a length of 5 cm or more or flaming continuously for 3 minutes or more was measured, and the test was repeated three times under the same conditions, thereby obtaining the limiting oxygen index LOI.

(Iron Settability)

This is an index of ease of curl setting by a hair iron and curl retention of a curl-shape. The filaments were sandwiched softly by the hair iron that was heated at 180° C., were wound three times, and were pre-heated. Fusion between the filaments, and frizzing and filament breakage of the filaments at this time were evaluated by visual observation. Next, the pre-heated filaments were wound around the hair iron, were retained for 10 seconds, and then the iron was withdrawn. Ease of this withdrawing (a rod out property) and the curl retention at the time of the withdrawing were evaluated by visual observation.

-Fusion-

A: found no fusion

B: found slight fusion

C: found fusion

-Frizzing/Filament Breakage-

A: found no frizzing/filament

B: found slight frizzing/filament
C: found frizzing/filament
-Rod Out-
A: iron rod could be withdrawn without resistance
B: iron rod could be withdrawn with slight resistance
C: iron rod could be withdrawn with resistance and was hardly withdrawn
-Settability-
A: being set easily with a stable curl
B: being set easily, but with a slightly unstable curl
C: being set hardly or with an unstable curl A compound with a ratio shown in Table 1 was dried to have a moisture content of 100 ppm or less, and 2 parts of a polyester pellet for coloration PESM6100 BLACK (produced by Dainichiseika Color & Chemicals Mfg. Co., Ltd., a carbon black content was 30%, and polyester was contained in the component (A)) was added thereto, which was dry-blended, was supplied to a biaxial extruder (produced by The Japan Steel Works, LTD., TEX44), was melt-kneaded at a cylinder set temperature of 280° C., was pelletized, and thereafter was dried to have a moisture content of 100 ppm or less. Subsequently, by using a melt spinning machine (produced by SHINKO MACHINERY CO., LTD, SV30), a melted polymer was extruded from a spinning pump adaptor that had a nozzle hole with a circle cross section having a nozzle diameter of 0.5 mmϕ at the cylinder set temperature of 280° C., was cooled in a water bath at a water temperature of 50° C. that was set at a position of 30 mm under the pump adaptor, and was wound at a speed of 100 m/min, thereby obtaining an undrawn filament. The obtained undrawn filament was drawn four times by using a heat roll that was heated at 85° C., was subjected to heat treatment by using the heat roll that was heated at 200° C., and was wound at a speed of 30 m/min, thereby obtaining a polyester-based fiber (a multifilament) with an unifilar fiber fineness of about 50 dtex.

TABLE 1

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| polyester (A) | EFG-85A*[1] | 100 | 100 | 100 | 100 | 100 | 100 | 100 | 100 | 100 | 100 | 100 | 100 | 100 | 100 | 100 | 70 | 70 |
| | KP-210*[2] | | | | | | | | | | | | | | | | | 30 | |
| | EASTER6563*[3] | | | | | | | | | | | | | | | | | | 30 |
| bromine-containing flame retardancy agent (B) | CR-900*[4] | 8 | 16 | | | | | | | | | | 16 | | | | | | |
| | SR-T20000*[5] | | | 12 | 20 | 20 | 20 | 20 | | | 15 | 20 | | 20 | 20 | 20 | 20 | 20 | |
| | YPB-43M*[6] | | | | | | | | 20 | | | | | | | | | | |
| | FG-7500*[7] | | | | | | | | | 16 | | | | | | | | | |
| antimony compound (C) | PATOX-P*[8] | | | | 1 | 2 | | | | | | | 2 | 2 | 2 | 2 | | | |
| | NA-1070L*[9] | 1.5 | 3 | | | 1.5 | 3 | 1 | 3 | 2 | | | | | | | | 3 | 3 |
| | SA-A (classification)*[10] | | | | | | | | | | 3 | 2 | | | | | | | |
| | PATOX-M*[11] | | | | | | | | | | | | | | | | | | |
| (D) | stabagsol*[12] | | | | | | | | | | | | 2 | 2 | | | | | |
| | 2,2'-(1,3-phenylene)-bis(2-oxazoline) | | | | | | | | | | | | | | | 1 | | | |
| | tolylene diisocyanate | | | | | | | | | | | | | | | | 1 | | |

*[1] polyethylene terephthalate, produced by Kanebo Synthetic Fibers Ltd.

*[2] polybutylene terephthalate, produced by Kolon Industries, Inc.

*[3] copolyester of polyethylene terephthalate and polycyclohexylene dimethacrylate, produced by Eastman Chemical Ltd.

*[4] tris(tribromoneopentyl)phosphate, produced by DAIHACHI CHEMICAL INDUSTRY CO., LTD.

*[5] brominated epoxy-based flame retardancy agent, produced by Sakamoto Yakuhin Kogyo Co., Ltd.

*[6] brominated phenoxy resin flame retardancy agent, produced by Tohto Kasei Co., Ltd.

*[7] brominated polycarbonate oligomer, produced by TEIJIN CHEMICALS LTD.

*[8] antimony trioxide, average particle diameter of 3 μm, produced by Nihon Seiko Co., LTD.

*[9] sodium antimonite, average particle diameter ranging from 3.5 μm to 5.5 μm, produced by NISSAN CHEMICAL INDUSTRIES, LTD.

*[10] sodium antimonite, average particle diameter of 1.9 μm, produced by Nihon Seiko Co., LTD.

*[11] antimony trioxide, average particle diameter of 0.5 μm, produced by Nihon Seiko Co., LTD.

*[12] aromatic polycarbodiimide having a carbodiimide structure (—N═C═N—), produced by Bayer AG Results of the evaluations of the strength/elongation, the transparency, the touch feeling, the flame retardancy and the iron settability that were obtained by using the obtained fiber will be shown in Table 2.

TABLE 2

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| spin processibility | | A | A | A | B | A | A | A | A | B | A | A | A | A | A | A | B | B |
| fineness (dtex) | | 49 | 52 | 51 | 52 | 49 | 51 | 49 | 52 | 51 | 52 | 51 | 52 | 51 | 52 | 50 | 52 | 50 |
| strength (cN/dtex) | | 2.1 | 1.9 | 2.5 | 2.2 | 2.4 | 2.2 | 2.4 | 2.3 | 2.0 | 2.1 | 2.3 | 1.9 | 2.5 | 2.2 | 2.0 | 2.2 | 2.4 |
| elongation (%) | | 53 | 48 | 55 | 51 | 58 | 54 | 54 | 48 | 42 | 45 | 47 | 48 | 55 | 51 | 53 | 51 | 55 |
| transparency | | B | B | B | B | B | B | B | B | B | B | B | B | B | B | B | A | A |
| touch feeling (tackiness) | | B | B | B | B | B | B | B | B | B | B | B | B | B | B | B | B | B |
| flame retardancy | flammability | A | A | A | A | A | A | A | A | A | A | A | A | A | A | A | A | A |
| | LOI | 29.0 | 31.5 | 28.5 | 29.5 | 30.0 | 30.5 | 31.0 | 29.0 | 29.0 | 28.5 | 29.0 | 31.5 | 28.5 | 29.5 | 29.0 | 29.5 | 29.5 |
| iron set (180° C.) | fusion | A | A | A | A | A | A | A | A | A | A | A | A | A | A | A | A | A |
| | frizzing/filament breakage | A | A | A | A | A | A | A | A | A | A | A | A | A | A | A | A | A |
| | rod out | B | B | A | A | A | A | A | B | B | A | A | B | A | A | A | A | A |
| | settability | A | A | A | A | A | A | A | A | A | A | A | A | A | A | A | A | A |

Comparative Examples 1 to 4

Each of compositions with ratios shown in Table 3 was dried to have a moisture content of 100 ppm or less, thereby obtaining polyester-based fibers (multifilaments) with unifilar fiber finenesses of about 50 dtex similarly to the Examples.

TABLE 3

| | | Comparative Example | | | |
|---|---|---|---|---|---|
| | | 1 | 2 | 3 | 4 |
| polyester (A) | EFG-85A*[1] | 100 | 100 | 100 | 100 |
| | KP-210*[2] | | | | |
| | EASTER6563*[3] | | | | |
| bromine-containing flame retardancy agent (B) | CR-900*[4] | | | | |
| | SR-T20000*[5] | 20 | 20 | | |
| | YPB-43M*[6] | | | | |
| | FG-7500*[7] | | | 16 | |
| antimony compound (C) | PATOX-P*[8] | | | | 2 |
| | NA-1070L*[9] | | | | |
| | SA-A (classification)*[10] | | | | |
| | PATOX-M*[11] | 2 | 2 | | |
| (D) | stabagsol*[12] | | | | |
| | 2,2'-(1,3-phenylene)-bis(2-oxazoline) | | | | |
| | tolylene diisocyanate | | | | |

Results of the evaluations of the strength/elongation, the transparency, the touch feeling, the flame retardancy and the iron settability that were obtained by using the obtained fiber will be shown in Table 4.

TABLE 4

| | Comparative Example | | | |
|---|---|---|---|---|
| | 1 | 2 | 3 | 4 |
| spin processibility | A | B | B | A |
| fineness (dtex) | 51 | 49 | 50 | 51 |
| strength (cN/dtex) | 2.5 | 2.1 | 1.7 | 2.4 |
| elongation (%) | 56 | 48 | 35 | 43 |
| transparency | A | C | C | A |
| touch feeling (tackiness) | B | C | D | B |

TABLE 4-continued

| | | Comparative Example | | | |
|---|---|---|---|---|---|
| | | 1 | 2 | 3 | 4 |
| flame retardancy | flammability | B | A | A | D |
| | LOI | 26.5 | 28.5 | 29.0 | 21.5 |
| iron set (180° C.) | fusion | A | A | A | A |
| | frizzing/filament breakage | A | B | C | A |
| | rod out | A | A | A | A |
| | settability | A | A | A | A |

Producing Examples 1 to 3

Compositions with ratios shown in Table 5 were dried to have a moisture content of 100 ppm or less, was dry-blended, subsequently was supplied to a biaxial extruder (produced by The Japan Steel Works, LTD., TEX44), was melt-kneaded at a cylinder set temperature of 280° C., was pelletized, and then was dried to have a moisture content of 100 ppm or less. Thereafter, by using a melt spinning machine (produced by SHINKO MACHINERY CO., LTD, SV30), a melted polymer was extruded from a spinning pump adaptor that had 40 nozzle holes having diameters of 1 mm at the cylinder set temperature of 280° C., was cooled by cooling air at 20° C., and was wound at a speed of 100 m/min, thereby obtaining an undrawn filament. The obtained undrawn filament was drawn four times by using a heat roll that was heated at 85° C., was subjected to heat treatment by using the heat roll that was heated at 200° C., and was wound at a speed of 30 m/min, thereby obtaining a flame-retardant fiber (a multifilament) with an unifilar fiber fineness of about 50 dtex.

TABLE 5

|  |  | Producing Example | | |
|---|---|---|---|---|
|  |  | 1 | 2 | 3 |
| polyester (A) | EFG-85A*1 | 100 | 100 | 100 |
| bromine-containing flame retardancy agent (B) | CR-900*4 | 16 | | |
|  | SR-T20000*5 | | 20 | 8 |
| antimony compound (C) | NA-1070L*9 | | 2 | 3 |

*1 polyethylene terephthalate, produced by Kanebo Synthetic Fibers Ltd.
*4 tris(tribromoneopentyl)phosphate, produced by DAIHACHI CHEMICAL INDUSTRY CO., LTD.
*5 brominated epoxy-based flame retardancy agent, produced by Sakamoto Yakuhin Kogyo Co., Ltd.
*9 sodium antimonite, average particle diameter ranging from 3.5 μm to 5.5 μm, produced by NISSAN CHEMICAL INDUSTRIES, LTD. (Examples 18 to 33)

By using the fibers obtained in (Producing Examples 1) and (Producing Examples 2), aqueous solutions containing polyorganosiloxane-based fiber treating agents shown in Table 6 were prepared, tow filaments of total finenesses of 100,000 dtex were immersed therein and were squeezed so as to have liquid contents ranging from 20% to 30% with respect to tow weights, the solutions were attached thereto such that predetermined amounts (% cord) of fiber treating agents shown in Table 6 were attached, and they were dried at 130° C. for 10 minutes by using a hot air drier.

TABLE 6

|  | Example | | | | | | | |
|---|---|---|---|---|---|---|---|---|
|  | 18 | 19 | 20 | 21 | 22 | 23 | 24 | 25 |
| Producing Example 1 | 100 | 100 | 100 | 100 | 100 | | | |
| Producing Example 2 | | | | | | 100 | 100 | 100 |
| Producing Example 3 | | | | | | | | |
| K-901*14 | 0.10 | | | | | | | |
| KRE-05*15 | | 0.15 | 0.15 | 0.15 | | 0.10 | 0.10 | 0.15 |
| KRE-06*16 | | | | | 0.15 | | | |
| KRE-08*17 | | 0.05 | 0.05 | 0.05 | 0.05 | | | 0.05 |
| KRE-101*18 | | | | 0.10 | | | | |
| KRE-104*19 | | | | | | | | |
| F type*20 | 0.20 | | | | | 0.20 | | |
| KWC-Q*21 | | | 0.15 | | | | 0.20 | |
| KWC-B*22 | | | | | | | | |
| FZ-3156*23 | | | | | | | | |
| Producing Example 4 | | | | | | | | |

|  | Example | | | | | | | |
|---|---|---|---|---|---|---|---|---|
|  | 26 | 27 | 28 | 29 | 30 | 31 | 32 | 33 |
| Producing Example 1 | | | | | 100 | | 100 | |
| Producing Example 2 | 100 | 100 | 100 | 100 | | 100 | | 100 |
| Producing Example 3 | | | | | | | | |
| K-901*14 | | | | | | | | |
| KRE-05*15 | 0.25 | 0.15 | | | | | | |
| KRE-06*16 | | | 0.15 | 0.15 | | | | |
| KRE-08*17 | 0.08 | 0.05 | 0.05 | 0.05 | | | | |
| KRE-101*18 | | | | | | | | |
| KRE-104*19 | | 0.15 | | 0.15 | | | | |
| F type*20 | | | | | | | | |
| KWC-Q*21 | | | | | 0.10 | 0.10 | 0.08 | 0.08 |
| KWC-B*22 | | | | | 0.10 | 0.10 | 0.15 | 0.15 |
| FZ-3156*23 | | | | | 0.10 | 0.10 | | |
| Producing Example 4 | | | | | | | 0.08 | 0.08 |

*14 a dimethyl silicone-based fiber treating agent, produced by TAKEMOTO OIL & FAT Co., Ltd.
*15 an epoxy modified silicone-based fiber treating agent, produced by Matsumoto Yushi-Seiyaku Co., Ltd.
*16 an amino modified silicone-based fiber treating agent, produced by Matsumoto Yushi-Seiyaku Co., Ltd.
*17 a hardening agent for a crosslinking type silicone fiber treating agent, produced by Matsumoto Yushi-Seiyaku Co., Ltd.
*18 an anionic hydrophilic fiber treating agent, produced by Matsumoto Yushi-Seiyaku Co., Ltd.
*19 a cationic hydrophilic fiber treating agent, produced by Matsumoto Yushi-Seiyaku Co., Ltd.
*20 a nonionic/cationic hydrophobic fiber treating agent, produced by Matsumoto Yushi-Seiyaku Co., Ltd.
*21 a PO/EO random copolyether-based fiber treating agent, produced by MARUBISHI OIL CHEMICAL CO., LTD.
*22 amino modified silicone, produced by MARUBISHI OIL CHEMICAL CO., LTD.
*23 phenylmethyl silicone, a phenyl group introduction rate of 62.5%, produced by NIPPON UNICAR CO., LTD.

Producing Example 4

1 part of amino group-containing silane represented by a below structural formula (13) was provided with 50 parts of toluene in a three neck flask, and was dissolved uniformly. Subsequently, 1 part of a bromine-containing organic compound represented by a below structural formula (14) was provided, and was dissolved uniformly. It was stirred at 90° C. for 5 hours so as to synthesize a bromine-containing organosilicon compound (a bromine content of 35 wt %) represented by a below structural formula (15). It was dried under a reduced pressure, and 0.5 parts of polyoxyethylene alkylether and 7.5 parts of water were added thereto, thereby preparing an emulsion of 20%.

[Chemical Formula 30]

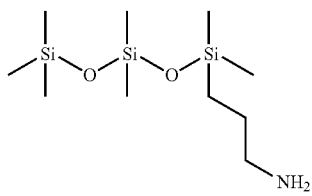

(13)

[Chemical Formula 31]

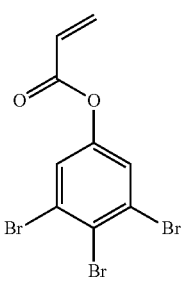

(14)

[Chemical Formula 32]

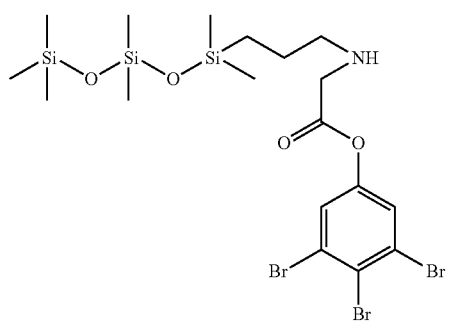

(15)

Results of the evaluations of the flame retardancy, the combing smoothness, the touch feelings and the antistatic properties of the respective fibers to which the fiber treating agents were attached will be shown in Table 7.

TABLE 7

| | Examples | | | | | | | | | | | | | | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| fineness (dtex) | 49 | 49 | 51 | 50 | 49 | 50 | 51 | 52 | 52 | 50 | 50 | 50 | 51 | 52 | 50 | 51 |
| flame retardancy — flame retardancy | A | A | A | A | A | A | A | A | A | A | A | A | A | A | A | A |
| flame retardancy — drip resistance | A | A | A | A | A | A | A | A | A | A | A | A | A | A | A | A |
| combing smoothness | B | B | A | A | B | B | B | B | A | A | B | A | B | B | B | B |
| touch feeling | B | B | B | B | B | B | B | B | A | A | B | A | B | B | B | B |
| antistatic property | B | B | B | B | B | B | B | B | B | B | B | B | B | B | B | B |

Comparative Examples 5 to 7

By using the fiber obtained in (Producing Example 3), aqueous solutions containing polyorganosiloxane-based fiber treating agents shown in FIG. 8 were prepared, tow filaments of total finenesses of 100,000 dtex were immersed therein and were squeezed so as to have liquid contents ranging from 20% to 30% with respect to tow weights, the solutions were attached thereto such that predetermined amounts (% omf) of fiber treating agents shown in Table 2 were attached, and they were dried at 130° C. for 10 minutes by using a hot air drier.

TABLE 8

| | Comparative Example | | |
|---|---|---|---|
| | 5 | 6 | 7 |
| Producing Example 1 | | | |
| Producing Example 2 | | | |
| Producing Example 3 | 100 | 100 | 100 |
| K-901*[14] | 1.50 | | |
| KRE-05*[15] | | | |
| KRE-06*[16] | | | |
| KRE-08*[17] | | | |
| KRE-101*[18] | | | |
| KRE-104*[19] | | 0.15 | 0.35 |
| F type*[20] | 0.20 | | |
| KWC-Q*[21] | | 0.20 | 0.50 |
| KWC-B*[22] | | | |
| FZ-3156*[23] | | | |
| Producing Example 4 | | | |

Results of the evaluations of the flame retardancy, the combing smoothness, the touch feelings and the antistatic properties of the respective fibers to which the fiber treating agents were attached will be shown in Table 9.

TABLE 9

| | Comparative Example | | |
|---|---|---|---|
| | 5 | 6 | 7 |
| fineness (dtex) | 49 | 49 | 51 |
| flame retardancy — flame retardancy | D | A | A |
| flame retardancy — drip resistance | D | A | A |
| combing smoothness | A | C | C |
| touch feeling | A | B | B |
| antistatic property | C | B | B |

As shown in Tables 7 and 9, in Examples, it was confirmed that, by attaching the polyorganosiloxane-based fiber treating agent to the flame-retardant fiber, the fiber for an artificial hair that exhibits a small decrease in flame retardancy, shows the sufficient flame retardancy, and the excellent combing smoothness, touch feeling and antistatic property can be obtained, compared with the Comparative Examples. Thus, it was confirmed that the fiber for the artificial hair of the present invention in which the polyorganosiloxane-based fiber treating agent is attached to the flame-retardant polyester-based fiber that contains the antimony compound (C) is excellent in the flame retardancy even when the polyorganosiloxane-based fiber treating agent is attached thereto, and is excellent in the light of the combing smoothness, the touch feeling and the antistatic property, compared with a fiber for an artificial hair that maintains its flame retardancy by using non-polyorganosiloxane-based fiber treating agent.

The invention claimed is:

1. An artificial hair comprising a flame-retardant polyester-based fiber that is formed of a composition obtained by melt-kneading, the composition comprising:
    100 parts by weight of polyester (A);
    5 parts by weight to 30 parts by weight of a bromine-containing flame retardancy agent (B);
    0.5 parts by weight to 10 parts by weight of an antimony compound (C) having an average particle diameter ranging from 1.5 µm to 15 µm; and
    0.05 parts by weight to 10 parts by weight of at least one kind of compound (D), which is at least one compound selected from the group consisting of biscarbodiimide compounds, polycarbodiimide compounds, bisoxazoline compounds, and isocyanate compounds,
    wherein the polyester (A) is made of at least one polymer selected from the group consisting of polyalkylene terephthalate and copolyester, where the copolyester contains polyalkylene terephthalate as a main component, and
    0.01% omf to 1% omf of a polyorganosiloxane-based fiber treating agent (E) is deposited on the flame-retardant polyester-based fiber.

2. The artificial hair according to claim 1, wherein the polyester (A) is at least one polyalkylene terephthalate polymer selected from the group consisting of polyethylene terephthalate, polypropylene terephthalate, and polybutylene terephthalate.

3. The artificial hair according to claim 1, wherein the bromine-containing flame retardancy agent (B) is at least one flame retardancy agent selected from the group consisting of brominated aromatic-based flame retardancy agents, bromine-containing phosphoric ester-based flame retardancy agents, brominated polystyrene-based flame retardancy agents, brominated benzil acrylate-based flame retardancy agents, brominated epoxy-based flame retardancy agents, brominated phenoxy-based flame retardancy agents, brominated polycarbonate-based flame retardancy agents, tetrabromobisphenol A derivatives, bromine-containing triazine-based compounds, and bromine-containing isocyanuric acid-based compounds.

4. The artificial hair according to any one of claims 1, wherein the antimony compound (C) is at least one compound selected from the group consisting of antimony trioxide, antimony tetraoxide; antimony pentaoxide; and sodium antimonite.

5. The artificial hair according to claim 1, wherein the compound (D) is at least one compound selected from the group consisting of p-phenylene-bis-o-triyl, carbodiimide, p-phenylene-bis-dicyclohexyl carbodiimide, p-phenylene-bis-dicyclohexyl carbodiimidev p-phenylene-bis-di-p-chlorphenyl carbodiimide, hexamethylene-bis-dicyclohexyl carbodiimide, ethylene-bis-diphenyl carbodiimide, ethylene-bis-di-cyclohexyl carbodiimide, poly(1,6-hexamethylene carbodiimide), poly(4,4'-methylenebiscyclohexyl carbodiimide), poly(4,4'-diphenylmethane carbodiimide), poly(3,3'-dimethyl-4,4'-diphenylmethane carbodiimide, poly(naphthylene carbodiimide), poly(p-phenylene carbodiimide), poly(m-phenylene carbodiimide), poly(tolylcarbodiimide), poly(diisopropylphenylene carbodiimide, poly(methyldiisopropylphenylene carbodiimide, poly(triethylphenylene carbodiimide, poly(triisopropylphenylene carbodiimide, 2,2'-p-phenylene bis(2-oxazoline, 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylene bis(4,4-dimethyl-2-oxazoline), p-phenylene diisocyanate, tolylene diisocyanate, xylylene diisocyanate, 4,4'-diphenyldiisocyanate, 1,5-naphthalene diisocyanate, 4,4'-diphenylmethane diisocyanate (MDI), triphenylmethane triisocyanate, and 4,4'-diphenylether diisocyanate.

6. The artificial hair according claim to 1, wherein the polyorganosiloxane-based fiber treating agent (E) is polyorganosiloxane that has a structural unit represented by chemical formula (1) or chemical formula (2) below,

wherein, in the formula (1), each R' is independent, and represents an alkyl group with a carbon number ranging from 1 to 10, an aryl group with a carbon number ranging from 6 to 10, or an aralkyl group with a carbon number ranging from 7 to 10, which has a straight chain or a branch, and m represents an integer ranging from 4 to 200,

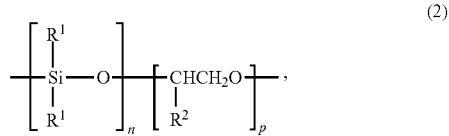

wherein, in the formula (2), each of $R^1$ and $R^2$ is independent, and represents an alkyl group with a carbon number ranging from 1 to 10, an aryl group with a carbon number ranging from 6 to 10, an aralkyl group with a carbon number ranging from 7 to 10, or an alkyleneoxy group with a carbon number ranging from 1 to 80, which has a straight chain or a branch, and n and p represent integers ranging from 2 to 150, respectively.

7. The artificial hair according to claim 1, wherein the polyorganosiloxane-based fiber treating agent (E) is made of polyorganosiloxane (E1) having reactivity and a hardening agent (E2), and a component ratio (E1)/(E2) ranges from 100/0 to 50/50 by weight.

8. The artificial hair according to claim 7, wherein the polyorganosiloxane (E1) having the reactivity is polyorganosiloxane that has a repeating structure represented by chemical formulae (3), (4), and (5) below,

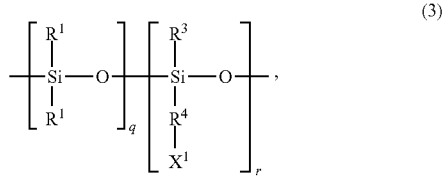
(3)

wherein, in the formula (3), each of $R^1$ and $R^3$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, $R^4$ represents an alkylene group with a carbon number ranging from 1 to 20 or an alkyleneoxy group with a carbon number ranging from 1 to 80, which has a straight chain or a branch, $X^1$ represents a hydroxy group, an epoxy group or an amino group, and q and r represent integers ranging from 2 to 150, respectively,

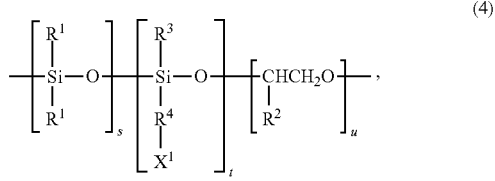
(4)

wherein, in the formula (4), each of $R^1$, $R^2$ and $R^3$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, $R^4$ represents an alkylene group with a carbon number ranging from 1 to 20 or an alkyleneoxy group with a carbon number ranging from 1 to 80, which has a straight chain or a branch, $X^1$ represents a hydroxy group, an epoxy group or an amino group, and s, t, and u represent integers ranging from 2 to 100, respectively,

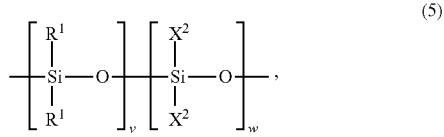
(5)

where, in the formula (5), each $R^1$ is independent, and represents an alkyl group with a carbon number ranging from 1 to 10, an aryl group with a carbon number ranging from 6 to 10 or an aralkyl group with a carbon number ranging from 7 to 10, which has a straight chain or a branch, each $X^2$ is independent and represents a hydroxy group, an alkoxy group, a phenoxy group, a thioalkoxy group, an acyloxy group, an aminoxy group, a ketoximate group, an amino group, an amide group or an alkenyloxy group, and v and w represent integers ranging from 2 to 100, respectively.

9. The artificial hair according to claim 7, wherein the hardening agent (E2) is at least one compound selected from the group consisting of a compound having at least two reactive groups selected from the group consisting of an epoxy group, an amino group, and an isocyanate group in one molecule and a silane coupling agent.

10. The artificial hair according to claim 7, the hardening agent (E2) is a compound having an epoxy group, which is at least one compound selected from the group consisting of ethyleneglycol diglycidylether; diethyleneglycol diglycidylether, triethyleneglycol diglycidylether , polyethyleneglycol diglycidylether, propyleneglycol diglycidylether, dipropyleneglycol diglycidylether, tripropyleneglycol diglycidylether, polypropyleneglycol diglycidylether, neopentylglycol diglycidylether, 1,6-hexanediol diglycidylether, 2,2-bis(4-hydroxyphenyl)propane diglycidylether, bis(4-hydroxyphenyl)methane diglycidylether, 1,1-bis(4-hydroxyphenyl)ethane diglycidylether , 2,2-bis(4-hydroxycyclohexyl)propane diglycidylether, 3,3', 5,5'-tetramethyl-4,4'-dihydroxybiphenyl diglycidylether, 2,2'-bis(4-(β-hydroxypropoxy)phenyl)propane diglycidylether, 3,4-epoxycyclohexylmethyl, 3,4-epoxycyclohexane carboxylate, and vinylcyclohexene dioxide.

11. The artificial hair according to claim 7, wherein the hardening agent (E2) is a compound having an amino group, which is at least one compound selected from the group consisting of ethylene diamine, 1,3-propylene diamine, tetramethylene diamine, pentamethylene diamine, hexamethylene diamine, octamethylene diamine, decamethylene diamine, undecamethylene diamine, dodecamethylene diamine, paraxylene diamine, 2,2,4- trimethylhexamethylene diamine, 2,4,4-trimethylhexamethylene diamine, and 3-methylpentamethylene diamine.

12. The artificial hair according to claim 7, wherein the hardening agent (E2) is a compound having an isocyanate group, which is at least one compound selected from the group consisting of 1,6-hexamethylene diisocyanate, 1,12-dodecamethylene diisocyanate, 2,2,4-trimethylhexamethylene diisocyanate, 2,4,4-trimethylhexamethylene diisocyanate, isophorone diisocyanate, 1,4-cyclohexane diisocyanate, 4,4'-dicyclohexylmethane diisocyanate, hydrogenated xylylene diisocyanate, p-phenylene diisocyanate, tolylene diisocyanate, xylylene diisocyanate, 4,4'-diphenyl diisocyanate, 1,5-naphthalene diisocyanate, 4,4'-diphenylmethane diisocyanate, triphenylmethane triisocyanate, and 4,4'-diphenylether diisocyanate.

13. The artificial hair according to claim 7, the hardening agent (E2) is a silane coupling agent, which is at least one agent selected from the group consisting of an amino group-containing silane coupling agent and an epoxy group-containing silane coupling agent.

14. The artificial hair according to claim 7, wherein the polyorganosiloxane-based fiber treating agent (E) is a fiber treating agent (F) containing a flame-retardant organosilicon compound.

15. The artificial hair according to claim 14,
wherein the fiber treating agent (F) containing the flame-retardant organosilicon compound comprises at least one compound selected from the group consisting of an organosilicon compound (F1) in which a bromine-containing organic group is bonded to a silicon atom via a carbon atom and an organosilicon compound (F2) in which a chlorine-containing organic group is bonded to a silicon atom via a carbon atom,
a total content of the organosilicon compound (F1) and the organosilicon compound (F2) ranges from 10 wt % to 70 wt %, where relative to a total amount of the fiber treating agent (F) as 100 wt %, and a total content of the bromine and the chlorine in the organosilicon compound (F1) and the organosilicon compound (F2) ranges from 10 wt % to 50 wt % relative to, a total amount of the organosilicon compound (F1) and the organosilicon compound (F2) as 100 wt %.

16. The artificial hair according to claim 14, wherein at least one of the organosilicon compound (F1) and the organosilicon compound (F2) has a structure represented by chemical formula (6) below, and includes at least one of an alkyl group or an aromatic hydrocarbon group that contains at least one bromine or chlorine,

(6)

where, in the structural formula (6), R independently represents a group selected from the group consisting of an alkyl group with a carbon number ranging from 1 to 6 containing at least one bromine or chlorine or an aromatic hydrocarbon group with a carbon number ranging from 6 to 15 containing at least one bromine or chlorine, a hydrogen atom, and an alkoxyl group, and m represents an integer of 0 or more.

17. The artificial hair according to claim 16, wherein the at least one of the organosilicon compound (F1) and the organosilicon compound (F2) has a substituent having a structure that is represented by chemical formula (7) below,

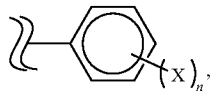

(7)

where, in the structural formula (7), X represents Br or Cl, and n represents an integer ranging from 1 to 3.

18. The artificial hair according to claim 17, wherein the at least one of the organosilicon compound (F1) and the organosilicon compound (F2) has a substituent having a structure that is represented by chemical formula (8) below,

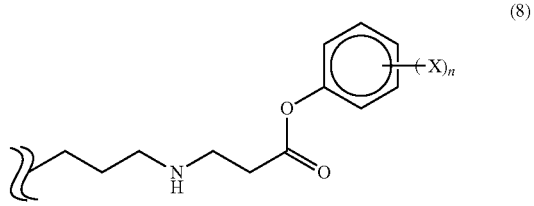

(8)

where, in the structural formula (8), X represents Br or Cl, and n represents an integer ranging from 1 to 3.

19. The artificial hair according to claim 14,
wherein the fiber treating agent (F) containing the flame-retardant organosilicon compound as a main component has a structure in which a phenyl group or a phenyl derivative group is bonded to a silicon atom in the flame-retardant organosilicon compound, and an introduction ratio of the phenyl group or the phenyl derivative group bonded into the silicon atoms is 30% or more, and the fiber treating agent (F) comprises an organosilicon compound (F3) that does not contain a bromine atom or a chlorine atom.

20. The artificial hair according to claim 1, wherein a hydrophilic fiber treating agent is further deposited on the flame-retardant polyester-based fiber.

21. The artificial hair according to claim 1, wherein the flame-retardant polyester-based fiber is uncrimped raw silk-like fiber.

22. The artificial hair according to claim 1, wherein the flame-retardant polyester-based fiber is doped.

23. The artificial hair according to claim 1, wherein unifilar fiber fineness of the flame-retardant polyester-based fiber ranges from 10 dtex to 100 dtex.

* * * * *